United States Patent (10) Patent No.: US 11,001,224 B2
Ueda et al. (45) Date of Patent: May 11, 2021

(54) GAS GENERATOR

(71) Applicant: NIPPON KAYAKU KABUSHIKI KAISHA, Chiyoda-ku (JP)

(72) Inventors: Shinya Ueda, Himeji (JP); Satoshi Ohsugi, Himeji (JP); Hiroaki Koyama, Himeji (JP); Haruki Takizawa, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 16/500,036

(22) PCT Filed: Mar. 13, 2018

(86) PCT No.: PCT/JP2018/009750
§ 371 (c)(1),
(2) Date: Oct. 1, 2019

(87) PCT Pub. No.: WO2018/186122
PCT Pub. Date: Oct. 11, 2018

(65) Prior Publication Data
US 2020/0180548 A1 Jun. 11, 2020

(30) Foreign Application Priority Data
Apr. 3, 2017 (JP) .............................. JP2017-073832

(51) Int. Cl.
*B60R 21/264* (2006.01)
(52) U.S. Cl.
CPC ................................. *B60R 21/264* (2013.01)
(58) Field of Classification Search
CPC .................................................. B60R 21/264
See application file for complete search history.

(56) References Cited

U.S. PATENT DOCUMENTS 5,366,239 A * 11/1994 Headley .............. B60R 21/2644
280/728.2
6,068,291 A * 5/2000 Lebaudy ............. B60R 21/2644
280/736
(Continued)

FOREIGN PATENT DOCUMENTS

JP 2008-238841 A 10/2008
WO WO 2015/163290 A1 10/2015

OTHER PUBLICATIONS

International Search Report dated Jun. 12, 2018 in PCT/JP2018/009750 filed Mar. 13, 2018.

*Primary Examiner* — Michelle Clement
(74) *Attorney, Agent, or Firm* — Oblon, McClelland, Maier & Neustadt, L.L.P.

(57) ABSTRACT

A gas generator includes a housing constructed by combining and joining a plurality of shell members. One of the plurality of shell members includes a cylindrical portion and a flange portion. The cylindrical portion is provided with a plurality of gas discharge openings including gas discharge openings different in opening area from one another. The flange portion is shaped such that a distance from an axial line of the cylindrical portion to an outer edge of the flange portion is non-uniform. When a perpendicular line is drawn to the axial line from a maximum outer geometry position in the outer edge of the flange portion most distant from the axial line, a gas discharge opening arranged closest to the perpendicular line is a gas discharge opening other than a gas discharge opening largest in opening area among the plurality of gas discharge openings.

7 Claims, 10 Drawing Sheets

(56) References Cited

U.S. PATENT DOCUMENTS

| | | | | |
|---|---|---|---|---|
| 6,474,684 | B1* | 11/2002 | Ludwig | B60R 21/2644 |
| | | | | 280/736 |
| 6,692,022 | B2* | 2/2004 | Schenck | B60R 21/276 |
| | | | | 280/736 |
| 6,964,430 | B2* | 11/2005 | Blackburn | B60R 21/2644 |
| | | | | 280/741 |
| 7,427,082 | B2* | 9/2008 | Schoenhuber | B60R 21/26 |
| | | | | 280/736 |
| 8,740,245 | B2* | 6/2014 | Fukawatase | B60R 21/2644 |
| | | | | 280/736 |
| 9,010,803 | B2* | 4/2015 | Smith | B60R 21/2644 |
| | | | | 280/741 |
| 9,452,729 | B2* | 9/2016 | Bierwirth | B60R 21/264 |
| 2009/0295132 | A1* | 12/2009 | Jackson | B60R 21/2644 |
| | | | | 280/736 |
| 2013/0200600 | A1* | 8/2013 | Bierwirth | B60R 21/264 |
| | | | | 280/740 |
| 2017/0043742 | A1* | 2/2017 | Ueda | B60R 21/264 |

* cited by examiner

FIG.7
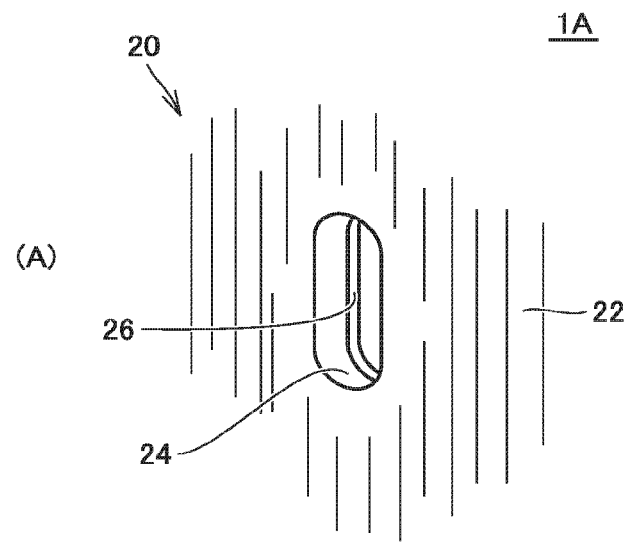
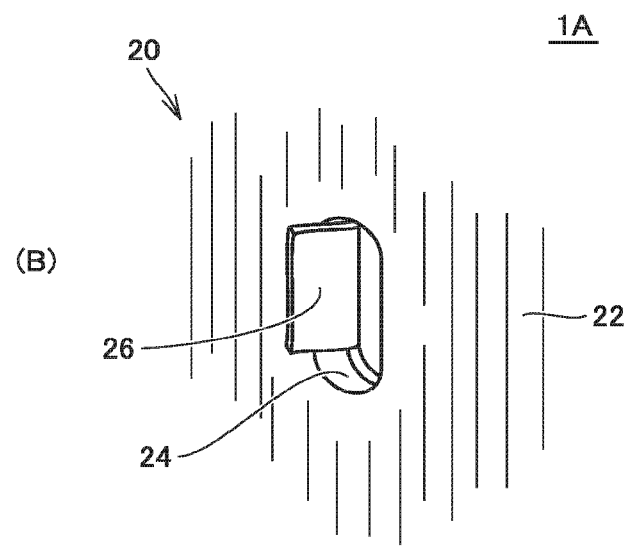

GAS GENERATOR

TECHNICAL FIELD

The present invention relates to a gas generator incorporated in a passenger protection apparatus which protects a driver and/or a passenger at the time of collision of a vehicle or the like, and particularly to a gas generator incorporated in an air bag apparatus equipped in a car.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with an air bag serving as a cushion, as the air bag is expanded and developed instantaneously at the time of collision of the vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Gas generators of various structures are available. A disc-type gas generator in a substantially short columnar shape relatively great in outer diameter is available as a gas generator suitably used for an air bag apparatus on a driver's seat side or an air bag apparatus on a passenger's seat side, and a cylinder-type gas generator in a substantially long columnar shape relatively small in outer diameter is available as a gas generator suitably used for a side air bag apparatus, a curtain air bag apparatus, and a knee air bag apparatus.

Among these, a disc-type gas generator includes a short cylindrical housing having opposing axial ends closed, a plurality of gas discharge openings being provided in a circumferential wall portion of the housing, the housing being filled with a gas generating agent to surround an igniter assembled to the housing, and a filter being accommodated in the housing to surround the gas generating agent.

In the disc-type gas generator, the housing is often constructed by combining a pair of shell members substantially in a cylindrical shape with bottom. One of the shell members is provided with a flange portion which is a part for fixing the disc-type gas generator to an external member (for example, a retainer provided in an air bag apparatus).

In general, it is important for a gas generator to burn a gas generating agent continually in a stable manner at the time of activation. In order to burn the gas generating agent continually in a stable manner, the gas generating agent should be placed in a prescribed high-pressure environment. Therefore, the gas generator is designed to narrow a size of a plurality of gas discharge openings provided in the housing to a desired size so that a pressure in a space in a housing is raised to a considerable level at the time of activation.

Output characteristics of the gas generator, however, are affected by an ambient environment in which the gas generator is placed, and particularly dependent on an environmental temperature. The output characteristics tend to be enhanced in a high-temperature environment and weakened in a low-temperature environment. In the high-temperature environment, gas is discharged earlier and more strongly, and in the low-temperature environment, the gas is discharged more slowly and weakly. Therefore, in particular in the low-temperature environment, significant drop in pressure in the housing due to opening of the gas discharge openings tends to occur, continual burning of the gas generating agent may be impeded, and gas output may be insufficient.

In order to lessen difference in gas output performance due to an environmental temperature, for example, WO2015/163290 (PTD 1) discloses a gas generator constructed to include a plurality of gas discharge openings different in opening pressure provided in a housing.

In the gas generator constructed as such, the plurality of gas discharge openings are opened stepwise with increase in pressure in a space inside the housing. Therefore, as compared with a gas generator constructed such that all gas discharge openings are opened in unison with increase in pressure in a space inside a housing, significant drop in pressure in the housing in particular in a low-temperature environment can be prevented.

Therefore, with the gas generator constructed as such, a gas generating agent can burn continually in any temperature environment from a high-temperature environment to a low-temperature environment, and consequently a difference in gas output performance attributed to an environmental temperature can be lessened.

FIGS. 10 to 12 of the publication disclose a disc-type gas generator constructed such that a plurality of gas discharge openings are opened in three stages with increase in pressure in the space inside the housing at the time of activation by providing in a circumferential wall portion of the housing, the plurality of gas discharge openings of which opening pressures are set in three stages. When general specifications required of a disc-type gas generator are taken into consideration, the gas generator is preferably set such that the plurality of gas discharge openings are opened in three stages.

CITATION LIST

Patent Literature

PTL 1: WO2015/163290

SUMMARY OF INVENTION

Technical Problem

In recent years, a gas generator has strongly been required to be smaller in size and lighter in weight. In order to reduce a size and a weight of the gas generator, it is effective to decrease a thickness of a housing which is a pressure-resistant container. When a thickness of the housing is simply made smaller, however, pressure-resistant performance of the housing cannot sufficiently be secured.

In particular, in a gas generator in which a plurality of gas discharge openings including those different in opening area from one another for stepwise opening thereof at the time of activation are provided in the housing, how to achieve reduction in size and weight while ensuring pressure-resistant performance is an important issue.

Therefore, the present invention was made in view of the problem described above, and an object thereof is to achieve reduction in size and weight of a gas generator in which a plurality of gas discharge openings including gas discharge openings different in opening area from one another are provided in a housing while ensuring pressure-resistant performance thereof.

Solution to Problem

A gas generator based on the present invention includes a housing, a gas generating agent, and an igniter. The housing includes a circumferential wall portion, a top plate portion, and a bottom plate portion. The housing has opposing axial ends of the circumferential wall portion closed by the top plate portion and the bottom plate portion. The gas generating agent is arranged in the housing and generates gas by being burnt. The igniter is assembled to the housing and serves to burn the gas generating agent. The housing is constructed by combining and joining a plurality of shell members. One of the plurality of shell members includes at least a cylindrical portion which forms at least a part of the circumferential wall portion and a flange portion continuously extending radially outward from one axial end of the cylindrical portion. The cylindrical portion is provided with a plurality of gas discharge openings including gas discharge openings different in opening area from one another. The flange portion is shaped such that a distance from an axial line of the cylindrical portion to an outer edge of the flange portion is non-uniform. In the gas generator based on the present invention, when a perpendicular line is drawn to the axial line of the cylindrical portion from a maximum outer geometry position in the outer edge of the flange portion most distant from the axial line of the cylindrical portion, a gas discharge opening arranged closest to the perpendicular line is a gas discharge opening other than a gas discharge opening largest in opening area among the plurality of gas discharge openings.

In the gas generator based on the present invention, preferably, none of the plurality of gas discharge openings are arranged at a position on a plane including the perpendicular line and the axial line of the cylindrical portion.

In the gas generator based on the present invention, preferably, the flange portion is provided with a through hole for fixing the gas generator to an external member, and in that case, preferably, the distance from the axial line of the cylindrical portion to the outer edge of the flange portion is longer in a portion of the flange portion provided with the through hole than in a portion of the flange portion where no through hole is provided.

In the gas generator based on the present invention, preferably, the plurality of gas discharge openings are arranged as being aligned along a circumferential direction of the cylindrical portion.

In the gas generator based on the present invention, preferably, the housing includes as the plurality of shell members, a cylindrical upper shell with bottom which forms the top plate portion and the circumferential wall portion close to the top plate portion and a cylindrical lower shell with bottom which forms the bottom plate portion and the circumferential wall portion close to the bottom plate portion. In that case, the cylindrical portion provided with the plurality of gas discharge openings is defined by a portion of the upper shell which forms the circumferential wall portion close to the top plate portion, and the flange portion is provided as extending from an end portion of the upper shell on a side of the bottom plate portion in the portion which forms the circumferential wall portion close to the top plate portion. In that case, preferably, the upper shell and the lower shell are combined by inserting a portion of the lower shell which forms the circumferential wall portion close to the bottom plate portion into the portion of the upper shell which forms the circumferential wall portion close to the top plate portion. Furthermore, in that case, preferably, the igniter is assembled to a portion of the lower shell which forms the bottom plate portion.

In the gas generator based on the present invention, preferably, the plurality of gas discharge openings consist of a plurality of groups of gas discharge openings. In that case, preferably, the plurality of groups of gas discharge openings include only one group or two or more groups of first gas discharge openings consisting of a plurality of first gas discharge openings set to be opened at an identical first opening pressure and evenly arranged along a circumferential direction of the cylindrical portion in rotation symmetry at an angle not greater than 120[°] around the axial line of the cylindrical portion, one group or two or more groups of second gas discharge openings consisting of a plurality of second gas discharge openings set to be opened at an identical second opening pressure and evenly arranged along the circumferential direction of the cylindrical portion in rotation symmetry at an angle not greater than 120[°] around the axial line of the cylindrical portion, and one group or two or more groups of third gas discharge openings consisting of a plurality of third gas discharge openings set to be opened at an identical third opening pressure and evenly arranged along the circumferential direction of the cylindrical portion in rotation symmetry at an angle not greater than 120[°] around the axial line of the cylindrical portion. In that case, preferably, the second opening pressure is higher than the first opening pressure and the third opening pressure is higher than the second opening pressure. Furthermore, in that case, preferably, the plurality of gas discharge openings are arranged as not overlapping with each other in the circumferential direction of the cylindrical portion.

The gas discharge openings described above are grouped such that gas discharge openings as many as possible form one group of gas discharge openings. For example, when four gas discharge openings identical in opening pressure are provided along the circumferential direction of the circumferential wall portion of the housing, the four gas discharge openings can also be regarded as consisting of two groups in total of gas discharge openings which consist of a group of gas discharge openings consisting of two gas discharge openings arranged in rotation symmetry at 180[°] and a group of gas discharge openings consisting of two gas discharge openings arranged in rotation symmetry at 180[°]. The four gas discharge openings, however, are not regarded as such, but in this case, they are regarded as consisting of one group of gas discharge openings consisting of four gas discharge openings arranged in rotation symmetry at 90[°].

In the gas generator based on the present invention, preferably, at least any of the plurality of first gas discharge openings, the plurality of second gas discharge openings, and the plurality of third gas discharge openings is in such a shape that S and C satisfy a condition of $S/C \leq 0.27 \times S^{0.5}$ where S [mm$^2$] represents an opening area of one gas discharge opening and C [mm] represents a circumferential length of the one gas discharge opening.

In the gas generator based on the present invention, preferably, at least any of the plurality of first gas discharge openings, the plurality of second gas discharge openings, and the plurality of third gas discharge openings is in a shape of an elongated hole greater in opening width along an axial direction of the cylindrical portion than along a circumferential direction of the cylindrical portion.

Advantageous Effects of Invention

According to the present invention, reduction in size and weight of a gas generator in which a plurality of gas discharge openings including gas discharge openings different in opening area from one another are provided in a housing can be achieved while pressure-resistant performance thereof is ensured.

BRIEF DESCRIPTION OF DRAWINGS

FIG. 7 schematically shows a state in the vicinity of a gas discharge opening when the disc-type gas generator in the first embodiment of the present invention is activated.

FIG. 9 is a cross-sectional view of the upper shell along the line IX-IX shown in

FIG. 8.

FIG. 12 is an enlarged view of the first to third gas discharge openings shown in

FIG. 11.

DESCRIPTION OF EMBODIMENTS

Figure 1:
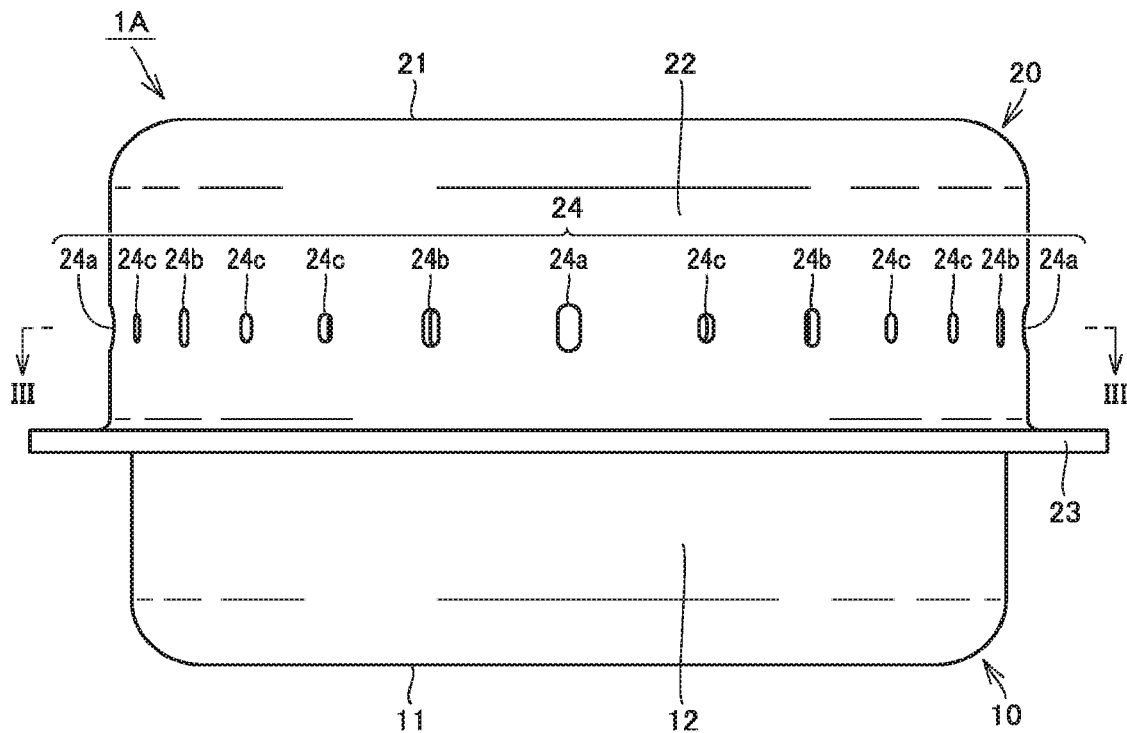
FIG. 1 is a front view of a disc-type gas generator in a first embodiment of the present invention.

An embodiment of the present invention will be described hereinafter in detail with reference to the drawings. An embodiment shown below represents application of the present invention to a disc-type gas generator suitably incorporated in an air bag apparatus equipped in a steering wheel or the like of a car. The same or common elements in the embodiment shown below have the same reference characters allotted in the drawings and description thereof will not be repeated.

First Embodiment

Figure 2:
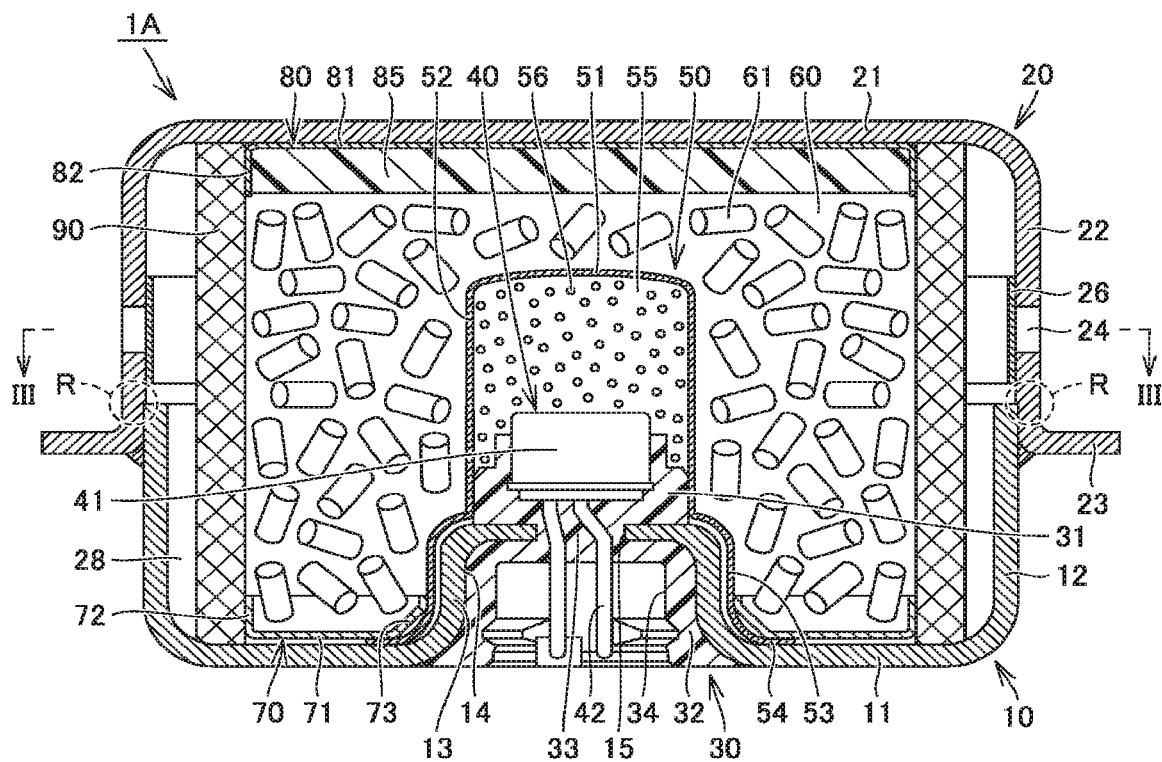
FIG. 2 is a schematic cross-sectional view of the disc-type gas generator shown in FIG. 1.

FIG. 1 is a front view of a disc-type gas generator in a first embodiment of the present invention and FIG. 2 is a schematic cross-sectional view of the disc-type gas generator shown in FIG. 1. A construction of a disc-type gas generator 1A in the present embodiment will initially be described with reference to FIGS. 1 and 2.

As shown in FIGS. 1 and 2, disc-type gas generator 1A in the present embodiment has a short substantially cylindrical housing having axial one and the other ends closed, and is constructed to accommodate as internal construction components in an accommodation space provided in the housing, a holding portion 30, an igniter 40, a cup-shaped member 50, an enhancer agent 56, a gas generating agent 61, a lower supporting member 70, an upper supporting member 80, a cushion material 85, a filter 90, and the like. In the accommodation space provided in the housing, a combustion chamber 60 mainly accommodating gas generating agent 61 among the internal construction components described above is located.

The housing includes a lower shell 10 and an upper shell 20 as shell members. Each of lower shell 10 and upper shell 20 is made, for example, of a press-formed product formed by press-working a plate-shaped member made of a rolled metal. A metal plate composed, for example, of stainless steel, iron steel, an aluminum alloy, a stainless alloy, or the like is made use of as the plate-shaped member made of metal which forms lower shell 10 and upper shell 20, and what is called a high tensile steel plate which is free from such a failure as fracture even at the time of application of tensile stress not lower than 440 [MPa] and not higher than 780 [MPa] is suitably made use of.

Lower shell 10 and upper shell 20 are each formed in a substantially cylindrical shape with bottom, and the housing is constructed by combining and joining the shells such that open surfaces thereof face each other. Lower shell 10 has a bottom plate portion 11 and a cylindrical portion 12 and upper shell 20 has a top plate portion 21, a cylindrical portion 22, and a flange portion 23.

Cylindrical portion 12 of lower shell 10 has an upper end press-fitted as being inserted in a lower end of cylindrical portion 22 of upper shell 20. Cylindrical portion 12 of lower shell 10 and cylindrical portion 22 of upper shell 20 are joined at a portion of abutment therebetween or in the vicinity thereof so that lower shell 10 and upper shell 20 are fixed. Electron-beam welding, laser welding, friction welding, or the like can suitably be made use of for joining lower shell 10 and upper shell 20 to each other.

A portion of a circumferential wall portion of the housing close to bottom plate portion 11 is thus formed by cylindrical portion 12 of lower shell 10, and a portion of the circumferential wall portion of the housing close to top plate portion 21 is formed by cylindrical portion 22 of upper shell 20. One and the other axial end portions of the housing are closed by bottom plate portion 11 of lower shell 10 and top plate portion 21 of upper shell 20, respectively.

Flange portion 23 of upper shell 20 is provided to continuously extend radially outward from an end portion thereof on a side of bottom plate portion 11 of lower shell 10 which is one axial end of cylindrical portion 22 of upper shell 20. Flange portion 23 is thus located as protruding radially outward from a position intermediate in the axial direction of the circumferential wall portion of the housing.

Flange portion 23 is a part for fixing disc-type gas generator 1A to an external member (for example, a retainer provided in an air bag apparatus). A through hole 25 (see FIG. 3) is provided at a prescribed position of flange portion 23 to pass therethrough along a direction in parallel to the axial direction of cylindrical portion 22. A not-shown fastening member such as a bolt is inserted in through hole 25 so that disc-type gas generator 1A is fixed to an external member.

As shown in FIG. 2, a protruding cylindrical portion 13 protruding toward top plate portion 21 is provided in a central portion of bottom plate portion 11 of lower shell 10, so that a depression portion 14 is formed in the central portion of bottom plate portion 11 of lower shell 10. Protruding cylindrical portion 13 is a site to which igniter 40 is fixed with holding portion 30 being interposed, and depression portion 14 is a site serving as a space for providing a female connector portion 34 in holding portion 30.

Protruding cylindrical portion 13 is formed to be in a substantially cylindrical shape with bottom, and an opening 15 in a non-point-symmetrical shape (for example, in a D shape, a barrel shape, or an elliptical shape) when viewed two-dimensionally is provided at an axial end portion located on a side of top plate portion 21. Opening 15 is a site through which a pair of terminal pins 42 of igniter 40 passes.

Igniter 40 serves to produce flames and includes an ignition portion 41 and a pair of terminal pins 42 described above. Ignition portion 41 contains an ignition agent producing flames by being ignited to burn at the time of activation and a resistor for igniting this ignition agent. The pair of terminal pins 42 is connected to ignition portion 41 for igniting the ignition agent.

More specifically, ignition portion 41 includes a squib cup formed like a cup and a base portion closing an opening end of the squib cup and holding a pair of terminal pins 42 as being inserted therein. The resistor (bridge wire) is attached to couple tip ends of the pair of terminal pins 42 inserted in the squib cup, and the ignition agent is loaded in the squib cup so as to surround the resistor or to be in proximity to the resistor.

Here, a Nichrome wire or the like is generally made use of as a resistor, and ZPP (zirconium potassium perchlorate), ZWPP (zirconium tungsten potassium perchlorate), lead tricinate, or the like is generally made use of as the ignition agent. The squib cup and the base portion described above are generally made of a metal or plastic.

Upon sensing collision, a prescribed amount of current flows in a resistor through terminal pin 42. As the prescribed amount of current flows in the resistor, Joule heat is generated in the resistor and the ignition agent starts burning. Flame at a high temperature caused by being burnt bursts the squib cup accommodating the ignition agent. A time period from flow of a current in the resistor until activation of igniter 40 is generally not longer than 2 [ms] in a case that the Nichrome wire is employed as the resistor.

Igniter 40 is attached to bottom plate portion 11 in such a manner that terminal pin 42 is introduced from the inside of lower shell 10 to pass through opening 15 provided in protruding cylindrical portion 13. Specifically, holding portion 30 formed from a resin molded portion is provided around protruding cylindrical portion 13 provided in bottom plate portion 11, and igniter 40 is fixed to bottom plate portion 11 as being held by holding portion 30.

Holding portion 30 is formed through injection molding (more specifically, insert molding) with the use of a mold, and formed by attaching an insulating fluid resin material to bottom plate portion 11 so as to reach a part of an outer surface from a part of an inner surface of bottom plate portion 11 through opening 15 provided in bottom plate portion 11 of lower shell 10 and solidifying the fluid resin material.

Igniter 40 is fixed to bottom plate portion 11 with holding portion 30 being interposed, in such a manner that terminal pin 42 is introduced from the inside of lower shell 10 to pass through opening 15 during molding of holding portion 30 and the fluid resin material described above is fed to fill a space between igniter 40 and lower shell 10 in this state.

For a source material for holding portion 30 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of holding portion 30 after molding, glass fibers or the like are preferably contained as fillers in these resin materials. In a case where sufficient mechanical strength can be ensured only by a thermoplastic resin, however, a filler as described above does not have to be added.

Holding portion 30 has an inner cover portion 31 covering a part of an inner surface of bottom plate portion 11 of lower shell 10, an outer cover portion 32 covering a part of an outer surface of bottom plate portion 11 of lower shell 10, and a coupling portion 33 located within opening 15 provided in bottom plate portion 11 of lower shell 10 and continuing to each of inner cover portion 31 and outer cover portion 32.

Holding portion 30 is secured to bottom plate portion 11 at a surface on a side of bottom plate portion 11, of each of inner cover portion 31, outer cover portion 32, and coupling portion 33. Holding portion 30 is secured at each of a side surface and a lower surface of igniter 40 which is closer to a lower end of ignition portion 41, as well as a surface of a portion of igniter 40 which is closer to an upper end of terminal pin 42.

Thus, opening 15 is completely buried by terminal pin 42 and holding portion 30, so that hermeticity of the space in the housing is ensured by sealability ensured in that portion. Since opening 15 is in a non-point-symmetrical shape in a plan view as described above, opening 15 and coupling portion 33 function also as a turning prevention mechanism which prevents holding portion 30 from turning with respect to bottom plate portion 11 by burying opening 15 with coupling portion 33.

In a portion of outer cover portion 32 of holding portion 30, which faces the outside, female connector portion 34 is formed. This female connector portion 34 is a site for receiving a male connector (not shown) of a harness for connecting igniter 40 and a control unit (not shown) to each other, and it is located in depression portion 14 provided in bottom plate portion 11 of lower shell 10.

In this female connector portion 34, a portion of igniter 40 closer to the lower end of terminal pin 42 is arranged as being exposed. The male connector is inserted in female connector portion 34, so that electrical conduction between a core wire of the harness and terminal pin 42 is established.

Injection molding described above may be carried out with the use of lower shell 10 obtained by providing an adhesive layer in advance at a prescribed position on a surface of bottom plate portion 11 in a portion to be covered with holding portion 30. The adhesive layer can be formed by applying an adhesive in advance to a prescribed position of bottom plate portion 11 and curing the adhesive.

By doing so, the cured adhesive layer is located between bottom plate portion 11 and holding portion 30, so that holding portion 30 formed from a resin molded portion can more firmly be secured to bottom plate portion 11. Therefore, by providing the adhesive layer annularly along a circumferential direction so as to surround opening 15 provided in bottom plate portion 11, higher sealability can be ensured in that portion.

For the adhesive applied in advance to bottom plate portion 11, an adhesive containing as a source material, a resin material excellent in heat resistance, durability, corrosion resistance, and the like after curing is suitably made use of, and for example, an adhesive containing a cyanoacrylate-based resin or a silicone-based resin as a source material is particularly suitably made use of. An adhesive containing as a source material other than the resin materials described above, a phenol-based resin, an epoxy-based resin, a melamine-based resin, a urea-based resin, a polyester-based resin, an alkyd-based resin, a polyurethane-based resin, a polyimide-based resin, a polyethylene-based resin, a polypropylene-based resin, a polyvinyl chloride-based resin, a polystyrene-based resin, a polyvinyl acetate-based resin, a polytetrafluoroethylene-based resin, an acrylonitrile butadiene styrene-based resin, an acrylonitrile styrene-based resin, an acrylic resin, a polyamide-based resin, a polyacetal-based resin, a polycarbonate-based resin, a polyphenylene ether-based resin, a polybutylene terephthalate-based resin, a polyethylene terephthalate-based resin, a polyolefin-based resin, a polyphenylene sulfide-based resin, a polysulfone-based resin, a polyether sulfone-based resin, a polyarylate-based resin, a polyether ether ketone-based resin, a polyamide imide-based resin, a liquid crystal polymer, styrene-based rubber, olefin-based rubber, and the like can be made use of as the adhesive described above.

Though such a construction example that igniter 40 can be fixed to lower shell 10 by injection molding holding portion 30 formed from the resin molded portion is exemplified, other alternative means can also be used for fixing igniter 40 to lower shell 10.

Cup-shaped member 50 is assembled to bottom plate portion 11 so as to cover protruding cylindrical portion 13, holding portion 30, and igniter 40. Cup-shaped member 50 has a substantially cylindrical shape with bottom having an open end portion on the side of bottom plate portion 11, and contains an enhancer chamber 55 accommodating enhancer agent 56. Cup-shaped member 50 is arranged to protrude toward combustion chamber 60 accommodating gas generating agent 61, such that enhancer chamber 55 provided therein faces ignition portion 41 of igniter 40.

Cup-shaped member 50 has a top wall portion 51 and a sidewall portion 52 defining enhancer chamber 55 described above and an extension portion 53 extending radially outward from a portion of sidewall portion 52 on a side of an open end. Extension portion 53 is formed to extend along an inner surface of bottom plate portion 11 of lower shell 10. Specifically, extension portion 53 is in a shape curved along a shape of an inner bottom surface of bottom plate portion 11 in a portion where protruding cylindrical portion 13 is provided and in the vicinity thereof and includes a tip end portion 54 extending like a flange in a radially outer portion thereof.

Tip end portion 54 in extension portion 53 is arranged between bottom plate portion 11 and lower supporting member 70 along the axial direction of the housing and sandwiched between bottom plate portion 11 and lower supporting member 70 along the axial direction of the housing. Since lower supporting member 70 is pressed toward bottom plate portion 11 by gas generating agent 61, cushion material 85, upper supporting member 80, and top plate portion 21 described above, cup-shaped member 50 is arranged in such a state that tip end portion 54 of extension portion 53 is pressed toward bottom plate portion 11 by lower supporting member 70 and fixed to bottom plate portion 11. Thus, cup-shaped member 50 is prevented from falling from bottom plate portion 11 without using swaging or press-fitting for fixing cup-shaped member 50.

Cup-shaped member 50 has an opening in neither of top wall portion 51 and sidewall portion 52 and surrounds enhancer chamber 55 provided therein. This cup-shaped member 50 bursts or melts with increase in pressure in enhancer chamber 55 or conduction of heat generated therein when enhancer agent 56 is ignited as a result of activation of igniter 40, and mechanical strength thereof is relatively low.

Therefore, a member made of metal such as aluminum or an aluminum alloy or a member made of a resin such as a thermosetting resin represented by an epoxy resin and the like and a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like is suitably made use of for cup-shaped member 50.

In addition to the above, a component which is formed from a member made of metal high in mechanical strength as represented by iron or copper, has an opening in sidewall portion 52 thereof, and has a sealing tape adhered to close the opening can also be made use of for cup-shaped member 50. A method of fixing cup-shaped member 50 is not limited to a fixing method using lower supporting member 70 described above, and other fixing methods may be made use of.

Enhancer agent 56 charged into enhancer chamber 55 generates thermal particles as it is ignited to burn by flames produced as a result of activation of igniter 40. Enhancer agent 56 should be able to reliably start burning gas generating agent 61, and generally, a composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed.

For enhancer agent 56, a powdery enhancer agent, an enhancer agent formed in a prescribed shape by a binder, or the like is made use of. A shape of enhancer agent 56 formed by a binder includes, for example, various shapes such as a granule, a column, a sheet, a sphere, a cylinder with a single hole, a cylinder with multiple holes, a tablet, and the like.

In a space surrounding a portion where cup-shaped member 50 described above is arranged in a space inside the housing, combustion chamber 60 accommodating gas generating agent 61 is located. Specifically, as described above, cup-shaped member 50 is arranged to protrude into combustion chamber 60 formed in the housing, and a space provided in a portion of this cup-shaped member 50 facing the outer surface of sidewall portion 52 and a space provided in a portion thereof facing an outer surface of top wall portion 51 are provided as combustion chamber 60.

In a space surrounding combustion chamber 60 accommodating gas generating agent 61 in a radial direction of the housing, filter 90 is arranged along an inner circumference of the housing. Filter 90 has a cylindrical shape and is arranged such that a central axis thereof substantially matches with the axial direction of the housing.

Gas generating agent 61 is an agent which is ignited by thermal particles generated as a result of activation of igniter 40 and produces gas as it burns. A non-azide-based gas generating agent is preferably employed as gas generating agent 61, and gas generating agent 61 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of Specifically, for example, nitroguanidine, guanidine nitrate, cyanoguanidine, 5-aminotetrazole, and the like are suitably made use of.

As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, for example, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, for example, silicon nitride, silica, Japanese acid clay, or the like can suitably be made use of. In addition, as the combustion modifier, for example, a metal oxide, ferrosilicon, activated carbon, graphite, or the like can suitably be made use of.

A shape of a molding of gas generating agent 61 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which disc-type gas generator 1A is incorporated, and for example, a shape optimal for the specifications is preferably selected by selecting a shape allowing change over time of a rate of generation of gas during burning of gas generating agent 61. Furthermore, in addition to a shape of gas generating agent 61, a size of a molding or an amount thereof for filling is preferably selected as appropriate, in consideration of a linear burning velocity, a pressure exponent, or the like of gas generating agent 61.

For example, a filter obtained by winding and sintering a metal wire rod of stainless steel or iron steel, a filter formed by press-working a mesh material into which metal wire rods are knitted to thereby pack the same, or the like can be made use of as filter 90. As the mesh material, specifically, a wire gauze of stocking stitch, a plain-woven wire gauze, an aggregate of crimped metal wire rods, or the like can be made use of.

In addition, a filter obtained by winding a perforated metal plate can also be made use of as filter 90. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like is made use of. In this case, a size or a shape of a hole to be provided can be changed as appropriate as required, and holes different in size or shape may be included in the same metal plate. It is noted that, for example, a steel plate (mild steel) or a stainless steel plate can suitably be made use of as a metal plate, and a nonferrous metal plate of aluminum, copper, titanium, nickel, or an alloy thereof, or the like can also be made use of.

Filter 90 functions as cooling means for cooling gas by removing heat at a high temperature of the gas when the gas produced in combustion chamber 60 passes through this filter 90 and also functions as removal means for removing residues (slag) or the like contained in the gas. Therefore, in order to sufficiently cool the gas and to prevent emission of residues to the outside, the gas generated in combustion chamber 60 should reliably pass through filter 90. Filter 90 is arranged to be distant from cylindrical portions 12 and 22 so as to provide a gap 28 of a prescribed size between cylindrical portion 22 of upper shell 20 and cylindrical portion 12 of lower shell 10 which form the circumferential wall portion of the housing.

As shown in FIGS. 1 and 2, a plurality of gas discharge openings 24 are provided in cylindrical portion 22 of upper shell 20 in a portion facing filter 90. The plurality of gas discharge openings 24 serve for guiding gas which has passed through filter 90 to the outside of the housing.

As shown in FIG. 2, to an inner circumferential surface of cylindrical portion 22 of upper shell 20, a sealing tape 26 made of a metal as a sealing member is attached to close the plurality of gas discharge openings 24. An aluminum foil or the like having a tacky member applied to its one surface is suitably made use of as this sealing tape 26 and hermeticity of combustion chamber 60 is ensured by sealing tape 26.

As shown in FIG. 1, in disc-type gas generator 1A in the present embodiment, the plurality of gas discharge openings 24 include three types of gas discharge openings different in opening area from one another (that is, a plurality of first gas discharge openings 24a, a plurality of second gas discharge openings 24b, and a plurality of third gas discharge openings 24c). These three types of gas discharge openings are constructed to be different in opening pressure from one another so as to be opened stepwise with increase in pressure in the above-described accommodation space which is a space in the housing as a result of burning of gas generating agent 61 at the time of activation of disc-type gas generator 1A.

Filter 90 and gap 28 are located between combustion chamber 60 and the plurality of gas discharge openings 24 as described above. A flow resistance of filter 90 against gas, however, is relatively low, and hence a pressure in the accommodation space is substantially equal to an internal pressure in combustion chamber 60. Therefore, in the description below, this pressure may also be referred to as the internal pressure in combustion chamber 60 instead of a pressure in the accommodation space.

First gas discharge opening 24a, second gas discharge opening 24b, and third gas discharge opening 24c described above are constructed to be different from one another in opening pressure owing to a difference in opening area thereof. By thus including a plurality of types of gas discharge openings 24 different in opening pressure from one another, significant drop in increase in internal pressure in combustion chamber 60 at the time of activation in particular in a low-temperature environment can be prevented and intended combustion characteristics can be obtained. Details thereof and a more detailed construction of the plurality of types of gas discharge openings 24 will be described later.

Referring again to FIG. 2, in the vicinity of the end portion of combustion chamber 60 located on the side of bottom plate portion 11, lower supporting member 70 is arranged. Lower supporting member 70 has an annular shape and is arranged as substantially being applied to filter 90 and bottom plate portion 11 so as to cover a boundary portion between filter 90 and bottom plate portion 11. Thus, lower supporting member 70 is located between bottom plate portion 11 and gas generating agent 61 in the vicinity of the end portion of combustion chamber 60.

Lower supporting member 70 has an abutment portion 72 erected to abut on the inner circumferential surface of the axial end portion of filter 90 located on the side of bottom plate portion 11 and a bottom portion 71 provided to extend radially inward from abutment portion 72. Bottom portion 71 is formed to extend along an inner bottom surface of bottom plate portion 11 of lower shell 10. Specifically, bottom portion 71 is in a shape bent along the shape of the inner bottom surface of bottom plate portion 11 including a portion where protruding cylindrical portion 13 is provided, and includes a tip end portion 73 erected in a radially inward portion thereof.

Lower supporting member 70 functions as flow-out prevention means for preventing gas generated in combustion chamber 60 at the time of activation from flowing out through a gap between the lower end of filter 90 and bottom plate portion 11 without passing through filter 90. Lower supporting member 70 is formed, for example, by press-working a plate-shaped member made of metal, and suitably made of a member formed from a steel plate of common steel, special steel, or the like (such as a cold rolled steel plate or a stainless steel plate).

Tip end portion 54 of extension portion 53 of cup-shaped member 50 described above is arranged between bottom plate portion 11 and bottom portion 71 of lower supporting member 70 along the axial direction of the housing. Thus, tip end portion 54 is held as being sandwiched between bottom plate portion 11 and bottom portion 71 along the axial direction of the housing. According to the construction as such, cup-shaped member 50 is in such a state that tip end portion 54 of extension portion 53 is pressed toward bottom plate portion 11 by bottom portion 71 of lower supporting member 70 and fixed to bottom plate portion 11.

Upper supporting member 80 is arranged at the end portion of combustion chamber 60 located on the side of top plate portion 21. Upper supporting member 80 is substantially in a shape of a disc and is arranged as being applied to filter 90 and top plate portion 21 so as to cover the boundary portion between filter 90 and top plate portion 21. Thus, upper supporting member 80 is located between top plate portion 21 and gas generating agent 61 in the vicinity of the end portion of combustion chamber 60.

Upper supporting member 80 has a bottom portion 81 abutting on top plate portion 21 and an abutment portion 82 erected from a peripheral edge of bottom portion 81. Abutment portion 82 abuts on the inner circumferential surface of an axial end portion of filter 90 located on the side of top plate portion 21.

Upper supporting member 80 functions as flow-out prevention means for preventing gas generated in combustion chamber 60 at the time of activation from flowing out through a gap between the upper end of filter 90 and top plate portion 21 without passing through filter 90. Similarly to lower supporting member 70, upper supporting member 80 is formed, for example, by press-working a plate-shaped member made of metal, and suitably made of a member formed from a steel plate of common steel, special steel, or the like (such as a cold rolled steel plate or a stainless steel plate).

In this upper supporting member 80, annular cushion material 85 is arranged to be in contact with gas generating agent 61 accommodated in combustion chamber 60. Cushion material 85 is thus located between top plate portion 21 and gas generating agent 61 in a portion of combustion chamber 60 on the side of top plate portion 21 and presses gas generating agent 61 toward bottom plate portion 11.

Cushion material 85 is provided for the purpose of preventing gas generating agent 61 made of a molding from being crushed by vibration or the like, and made of a member suitably formed of a molding of ceramic fibers, rock wool, or a foamed resin (such as foamed silicone, foamed polypropylene, or foamed polyethylene), or rubber represented by chloroprene and EPDM.

An operation of disc-type gas generator 1A in the present embodiment described above will now be described with reference to FIG. 2.

When a vehicle on which disc-type gas generator 1A in the present embodiment is mounted collides, collision sensing means separately provided in the vehicle senses collision, and based thereon, igniter 40 is activated in response to power feed through a control unit separately provided in the vehicle. Enhancer agent 56 accommodated in enhancer chamber 55 is ignited to burn by flames produced as a result of activation of igniter 40, to thereby generate a large amount of thermal particles. Burning of this enhancer agent 56 bursts or melts cup-shaped member 50 and the thermal particles described above flow into combustion chamber 60.

The thermal particles which have flowed in ignite and burn gas generating agent 61 accommodated in combustion chamber 60 and a large amount of gas is produced. The gas produced in combustion chamber 60 passes through filter 90. At that time, heat is removed from the gas through filter 90 and the gas is cooled, slag contained in the gas is removed by filter 90, and the gas flows into gap 28.

As a pressure in the space in the housing increases, sealing tape 26 which has closed gas discharge opening 24 provided in upper shell 20 is cleaved and the gas is discharged to the outside of the housing through gas discharge opening 24. The plurality of gas discharge openings 24 are opened stepwise and the discharged gas is introduced in the air bag provided adjacent to disc-type gas generator 1A and it expands and develops the air bag.

Figure 3:
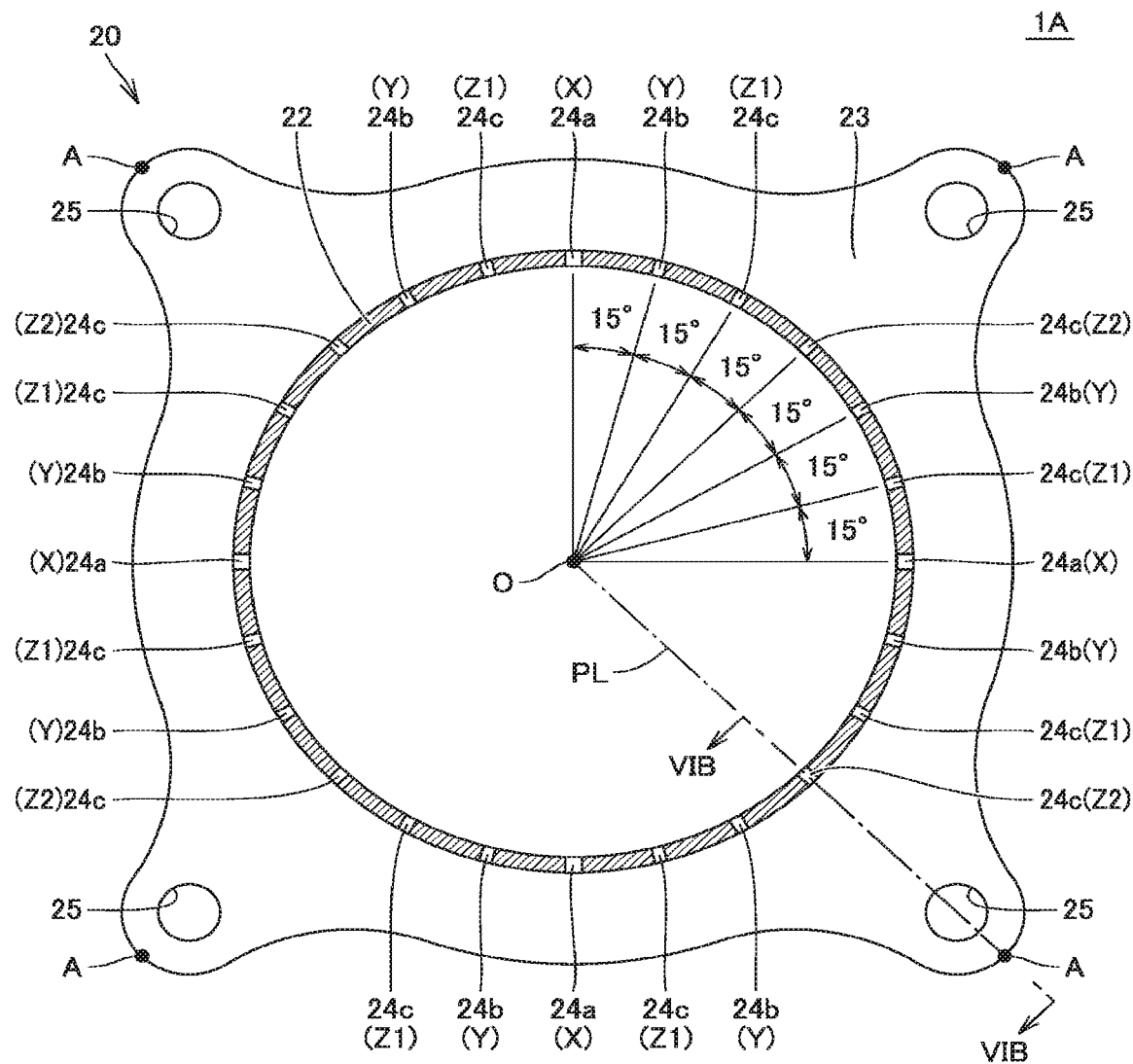
FIG. 3 is a cross-sectional view of an upper shell along the line shown in FIGS. 1 and 2.
Figure 4:
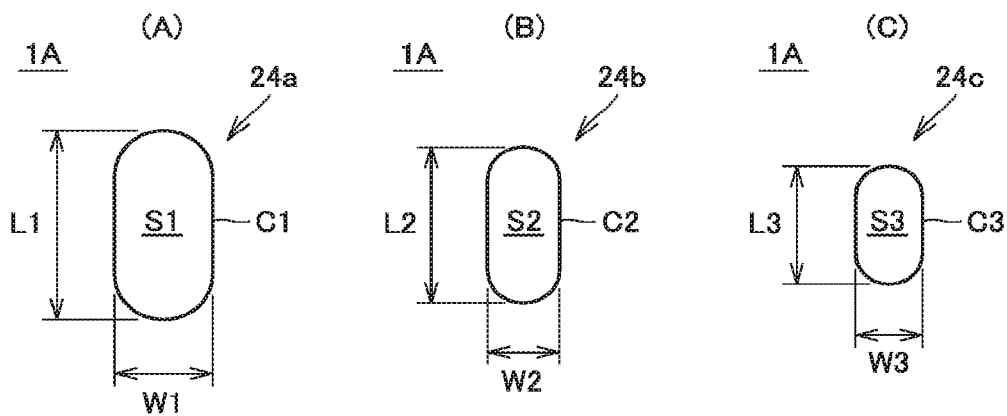
FIG. 4 is an enlarged view of first to third gas discharge openings shown in FIGS. 1 and 3.

FIG. 3 is a cross-sectional view of the upper shell along the line shown in FIGS. 1 and 2 and FIG. 4 is an enlarged view of the first to third gas discharge openings shown in FIGS. 1 and 3. A more detailed construction of upper shell 20 and a more detailed construction of first to third gas discharge openings 24a to 24c provided in cylindrical portion 22 of upper shell 20 will now be described with reference to FIGS. 3 and 4 and FIGS. 1 and 2 described previously.

As shown in FIG. 3, flange portion 23 of upper shell 20 is shaped such that a distance from an axial line O of cylindrical portion 22 of upper shell 20 to an outer edge of flange portion 23 is non-uniform. More specifically, disc-type gas generator 1A in the present embodiment is constructed such that through holes 25 described above are evenly provided at four locations in flange portion 23 along the circumferential direction and the above-mentioned distance in a portion of flange portion 23 where through hole 25 is provided is longer than the above-mentioned distance in a portion of flange portion 23 where no through hole 25 is provided.

Thus, a maximum outer geometry position A in the outer edge of flange portion 23 most distant from axial line O of cylindrical portion 22 is provided at four locations in total, each at a position corresponding to through hole 25 provided in flange portion 23, and the maximum outer geometry positions are located evenly at an interval of 90 [°] along the circumferential direction of cylindrical portion 22 of upper shell 20.

As shown in FIGS. 1 and 3, in disc-type gas generator 1A in the present embodiment, first gas discharge opening 24a, second gas discharge opening 24b, and third gas discharge opening 24c described above are provided as being aligned under a prescribed rule along the circumferential direction of cylindrical portion 22 of upper shell 20. More specifically, twenty-four gas discharge openings 24 in total are evenly arranged at a 15[°] interval along the circumferential direction of cylindrical portion 22 of upper shell 20.

Four first gas discharge openings 24a are provided and arranged every 90[°] along the circumferential direction of cylindrical portion 22 of upper shell 20. Eight second gas discharge openings 24b are provided and arranged every 45[°] along the circumferential direction of cylindrical portion 22 of upper shell 20. Twelve third gas discharge openings 24c are provided and arranged at intervals of 15[°], 30[°], 45[°], 15[°], 30[°], 45[°], . . . along the circumferential direction of cylindrical portion 22 of upper shell 20.

First gas discharge opening 24a, second gas discharge opening 24b, and third gas discharge opening 24c are arranged along the circumferential direction of cylindrical portion 22 of upper shell 20 in the order of first gas discharge opening 24a, second gas discharge opening 24b, third gas discharge opening 24c, third gas discharge opening 24c, second gas discharge opening 24b, and third gas discharge opening 24c, with this set being defined as one set and with four sets as such being repeated. The plurality of gas discharge openings 24 are thus arranged so as not to overlap with each other in the circumferential direction of cylindrical portion 22 of upper shell 20.

As shown in FIGS. 1 and 4 (A), first gas discharge opening 24a is in a shape of an elongated hole different in opening width in directions orthogonal to each other. More specifically, the first gas discharge opening is in such a shape of a vertically elongated hole that an opening width L1 along the axial direction of cylindrical portion 22 of upper shell 20 (hereinafter opening width L1 along the axial direction of cylindrical portion 22 being also referred to as a length L1) is greater than an opening width W1 along the circumferential direction of cylindrical portion 22 (hereinafter opening width W1 along the circumferential direction of cylindrical portion 22 being simply also referred to as a width W1). Strictly speaking, first gas discharge opening 24a is provided as a track-shaped hole having a pair of opening edge portions extending in parallel along the axial direction of cylindrical portion 22.

As shown in FIGS. 1 and 4 (B), second gas discharge opening 24b is in a shape of an elongated hole different in opening width in directions orthogonal to each other. More specifically, the second gas discharge opening is in such a shape of a vertically elongated hole that an opening width L2 along the axial direction of cylindrical portion 22 of upper shell 20 (hereinafter opening width L2 along the axial direction of cylindrical portion 22 being also referred to as a length L2) is greater than an opening width W2 along the circumferential direction of cylindrical portion 22 (hereinafter opening width W2 along the circumferential direction of cylindrical portion 22 being simply also referred to as a width W2). Strictly speaking, second gas discharge opening 24b is provided as a track-shaped hole having a pair of opening edge portions extending in parallel along the axial direction of cylindrical portion 22.

As shown in FIGS. 1 and 4 (C), third gas discharge opening 24c is in a shape of an elongated hole different in opening width in directions orthogonal to each other. More specifically, the third gas discharge opening is in such a shape of a vertically elongated hole that an opening width L3 along the axial direction of cylindrical portion 22 of upper shell 20 (hereinafter opening width L3 along the axial direction of cylindrical portion 22 being also referred to as a length L3) is greater than an opening width W3 along the circumferential direction of cylindrical portion 22 (hereinafter opening width W3 along the circumferential direction of cylindrical portion 22 being simply also referred to as a width W3). Strictly speaking, third gas discharge opening 24c is provided as a track-shaped hole having a pair of opening edge portions extending in parallel along the axial direction of cylindrical portion 22.

First gas discharge opening 24a, second gas discharge opening 24b, and third gas discharge opening 24c are all in a shape of a vertically elongated hole and thus all gas discharge openings 24 are in the shape of the vertically elongated hole.

Referring to FIGS. 4 (A) to 4 (C), S1 to S3 satisfy a condition of S1>S2>S3 where S1 represents an opening area per one first gas discharge opening 24a, S2 represents an opening area per one second gas discharge opening 24b, and S3 represents an opening area per one third gas discharge opening 24c. Namely, opening area S2 of second gas discharge opening 24b is smaller than opening area S1 of first gas discharge opening 24a, and opening area S3 of third gas discharge opening 24c is smaller than opening area S2 of second gas discharge opening 24b.

As shown in FIG. 3, in disc-type gas generator 1A in the present embodiment, when perpendicular line PL is drawn from above-described maximum outer geometry position A of flange portion 23 to axial line O of cylindrical portion 22 (FIG. 3 representatively showing an example in which perpendicular line PL is drawn from one of four maximum outer geometry positions A), gas discharge opening 24 arranged closest to perpendicular line PL is a gas discharge opening other than first gas discharge opening 24a largest in opening area among first gas discharge opening 24a, second gas discharge opening 24b, and third gas discharge opening 24c.

More specifically, when viewed along axial line O of cylindrical portion 22, third gas discharge opening 24c is arranged in cylindrical portion 22 as being superimposed on perpendicular line PL. Thus, among first gas discharge opening 24a, second gas discharge opening 24b, and third gas discharge opening 24c, it is third gas discharge opening 24c smallest in opening area that is arranged closest to perpendicular line PL.

According to such a construction, even though the housing as a pressure-resistant container is decreased in thickness (that is, a thickness of upper shell 20) for reduction in size and weight, high pressure-resistant performance can be ensured, which will be described later.

Referring to FIG. 2, sealing tape 26 is applied to the inner circumferential surface of upper shell 20 as described above and sealing tape 26 closes each of twenty-four gas discharge openings 24 in total. In this case, an opening pressure of gas discharge opening 24 is expressed as F×t×C/S, where F represents shear strength (tensile strength) of sealing tape 26, t represents a thickness of a portion of sealing tape 26 which closes gas discharge opening 24, C represents a circumferential length of the gas discharge opening (circumferential lengths C1 to C3 shown in FIG. 4 which correspond to circumferential length C), and S represents an opening area of gas discharge opening 24 (opening areas S1 to S3 described above which correspond to opening area S).

Therefore, by appropriately adjusting circumferential lengths C1 to C3 and opening areas S1 to S3 described above, an opening pressure of first gas discharge opening 24a is set to be lowest, an opening pressure of second gas discharge opening 24b is set to be second lowest, and an opening pressure of third gas discharge opening 24c is set to be highest in the present embodiment.

In setting the opening pressure, as is understood from the expression of the opening pressure above, the opening pressure can be higher by setting a longer circumferential length C while opening area S remains the same. In other words, by constructing the plurality of gas discharge openings 24 to be in a shape of a vertically elongated hole as in the present embodiment, various opening pressures can be set while an interval between adjacent gas discharge openings 24 is sufficiently ensured in order to suppress lowering in pressure-resistant performance of the housing. A degree of freedom in design is significantly improved and disc-type gas generator 1A can consequently be reduced in size as compared with an example in which opening pressures of the plurality of gas discharge openings are set in several levels while a total opening area of the plurality of gas discharge openings is increased simply by increasing a size of some of the plurality of gas discharge openings with a geometrically similar shape of a precise circle being maintained.

When a filter obtained by winding and sintering a metal wire rod of stainless steel or iron steel described above or a filter formed by press-working a mesh material into which metal wire rods are knitted to thereby pack the same is employed as filter 90, such a phenomenon that a pressure of the gas discharged through gas discharge openings 24 at the time of activation deforms filter 90 in portions facing gas discharge openings 24, the deformed portion is crushed outward, and consequently the filter sticks out of gas discharge openings 24 may occur.

This phenomenon is likely when gas discharge opening 24 has a shape of a precise circle and less likely when gas discharge opening 24 does not have the shape of the precise circle. The reason is estimated as follows. When gas discharge opening 24 has a shape of a non-precise circle, a flow resistance of gas discharge opening 24 in such a shape against the gas in a corner portion or a nook portion of gas discharge opening 24 increases, a flow rate of the gas which actually passes is suppressed as a whole with respect to an opening area of gas discharge opening 24, and force pushing filter 90 outward described above is weakened.

Based on this point of view, gas discharge opening 24 preferably has a shape of a non-precise circle as represented by a shape of a vertically elongated hole described above, and in particular, a gas discharge opening of which opening area is increased for setting a lower opening pressure preferably has a shape of a non-precise circle. The shape of the non-precise circle as referred to here includes various shapes, and examples thereof include a shape of a laterally elongated hole and a shape of an obliquely elongated hole in addition to the shape of the vertically elongated hole described above, and further include a cross shape, a V shape, a T shape, an asterisk shape, and a shape resulting from rotation of the former around the center.

When the shape is quantitatively expressed, at least any of the plurality of first gas discharge openings 24a, the plurality of second gas discharge openings 24b, and the plurality of third gas discharge openings 24c is in such a shape that S and C satisfy a condition preferably of $S/C \leq 0.27 \times S^{0.5}$ and more preferably of $S/C \leq 0.22 \times S^{0.5}$ where S [mm$^2$] represents an opening area of one gas discharge opening and C [mm] represents a circumferential length of the one gas discharge opening.

Figure 5:
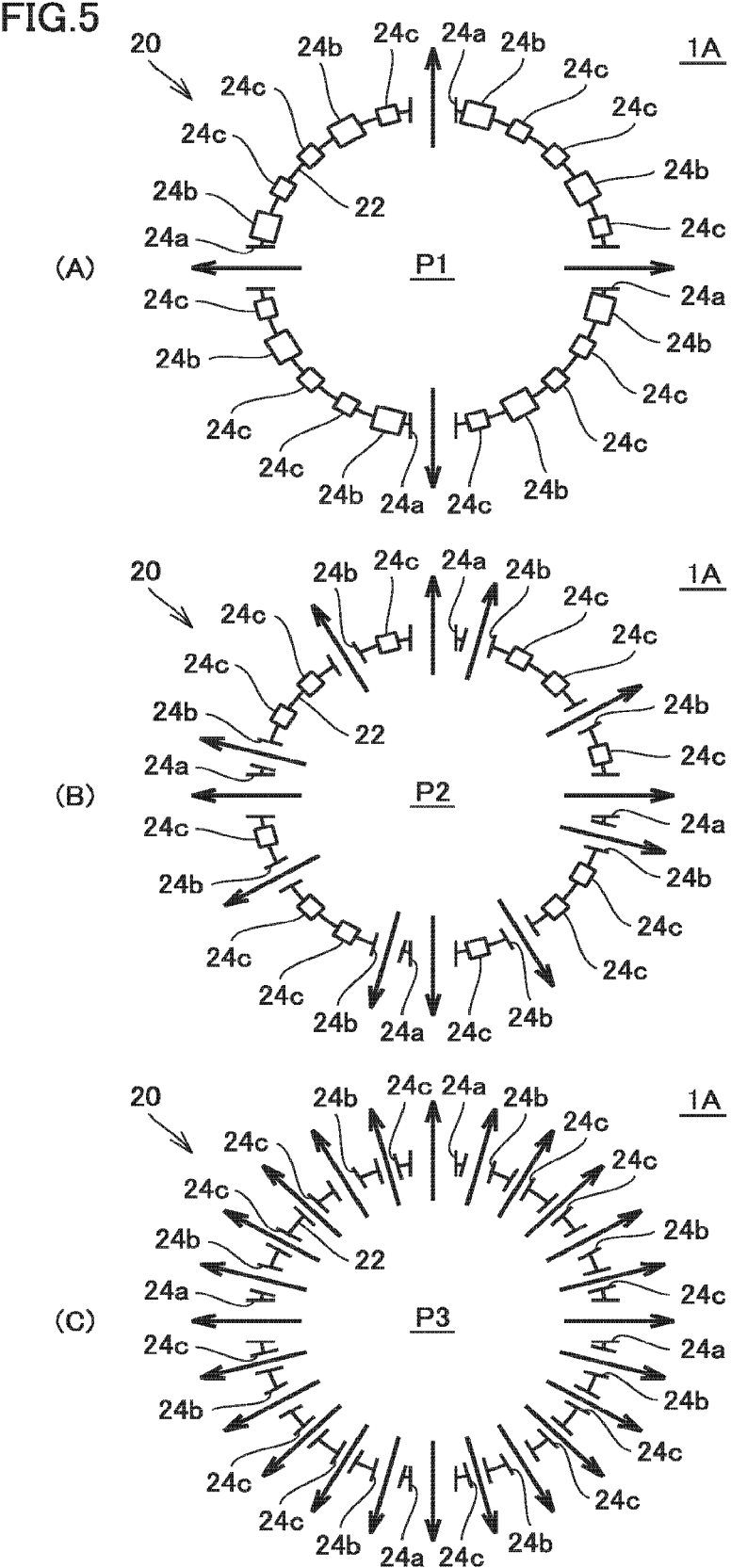
FIG. 5 schematically shows stepwise opening of the gas discharge openings at the time of activation of the disc-type gas generator in the first embodiment of the present invention.

FIG. 5 schematically shows stepwise opening of the gas discharge openings at the time of activation of the gas generator in the present embodiment. Then, a reason why significant drop in increase in internal pressure at the time of activation can be prevented in particular in a low-temperature environment in disc-type gas generator 1A in the present embodiment will now be described with reference to FIG. 5. FIGS. 5 (A), 5 (B), and 5 (C) each schematically show a state at the time point of lapse of a prescribed period of time since start of activation, and the elapsed time is longer in the order of FIGS. 5 (A), 5 (B), and 5 (C).

When disc-type gas generator 1A in the present embodiment is activated, gas generating agent 61 starts to burn and an internal pressure in combustion chamber 60 accordingly starts to increase. In disc-type gas generator 1A in the present embodiment, in a process of increase in internal pressure in combustion chamber 60, the plurality of gas discharge openings 24 open stepwise.

In a first stage after start of activation, the internal pressure in combustion chamber 60 has not reached a pressure at which all of first gas discharge opening 24a, second gas discharge opening 24b, and third gas discharge opening 24c can open. Therefore, first gas discharge opening 24a, second gas discharge opening 24b, and third gas discharge opening 24c do not open and the internal pressure continues to increase.

In a second stage after start of activation, the internal pressure in combustion chamber 60 reaches an internal pressure P1 at which four first gas discharge openings 24a lowest in opening pressure among first gas discharge openings 24a, second gas discharge openings 24b, and third gas discharge openings 24c can open, and portions of sealing tape 26 covering four first gas discharge openings 24a are accordingly cleaved as shown in FIG. 5 (A) so that gas is discharged through four open first gas discharge openings 24a. Thus, gas output is obtained in a relatively short period of time since start of activation and expansion and development of the air bag can be started in an early stage.

In the second stage after start of activation, second gas discharge openings 24b and third gas discharge openings 24c have not yet been opened. Therefore, an internal pressure in combustion chamber 60 is maintained in an appropriate high-pressure state and the internal pressure in combustion chamber 60 does not extremely drop. Therefore, stable combustion of gas generating agent 61 continues and expansion and development of the air bag can be maintained.

In a third stage after start of activation, the internal pressure in combustion chamber 60 reaches an internal pressure P2 at which eight second gas discharge openings 24b lowest in opening pressure next to first gas discharge openings 24a among first gas discharge openings 24a, second gas discharge openings 24b, and third gas discharge openings 24c can open, and portions of sealing tape 26 covering eight second gas discharge openings 24b are accordingly cleaved as shown in FIG. 5 (B) so that gas is discharged through open first gas discharge openings 24a and second gas discharge openings 24b twelve in total, inclusive of four first gas discharge openings 24a which have already been open.

In the third stage after start of activation, third gas discharge openings 24c have not yet been opened. Therefore, the internal pressure in combustion chamber 60 is maintained in an appropriate high-pressure state and the internal pressure in combustion chamber 60 does not extremely drop. Therefore, stable combustion of gas generating agent 61 continues and expansion and development of the air bag can be maintained.

In a fourth stage after start of activation, the internal pressure in combustion chamber 60 reaches an internal pressure P3 at which twelve third gas discharge openings 24c highest in opening pressure among first gas discharge openings 24a, second gas discharge openings 24b, and third gas discharge openings 24c can open, and portions of sealing tape 26 covering twelve third gas discharge openings 24c are accordingly cleaved as shown in FIG. 5 (C) so that gas is discharged through all open first gas discharge openings 24a, second gas discharge openings 24b, and third gas discharge openings 24c twenty-four in total, inclusive of first gas discharge openings 24a and second gas discharge openings 24b twelve in total which have already been open.

At this time point, the internal pressure in combustion chamber 60 has already reached a sufficiently high pressure state. Therefore, gas generating agent 61 continues combustion in a stable manner and gas output high in a stable manner is obtained until gas generating agent 61 burns out. Sustained development of the air bag can further continue.

In a fifth stage after start of activation, output of the gas is stopped with gas generating agent 61 having burnt out, and thus activation of disc-type gas generator 1A ends and development of the air bag also ends.

Thus, disc-type gas generator 1A in the present embodiment is constructed such that, at the time of activation of disc-type gas generator 1A, the plurality of gas discharge openings 24 open stepwise with increase in pressure in the accommodation space described above which is the space inside the housing with combustion of gas generating agent 61. Therefore, significant drop in increase in internal pressure can be prevented in particular in the low-temperature environment as compared with the disc-type gas generator constructed such that all gas discharge openings open in unison with increase in pressure in the space inside the housing. Therefore, sustained combustion of gas generating agent 61 can be achieved in any temperature environment from the high-temperature environment to the low-temperature environment, and consequently difference in gas output performance attributed to an environmental temperature can be lessened.

In order to reliably obtain an effect of lessening of difference in gas output performance attributed to the environmental temperature by setting the plurality of gas discharge openings 24 to open in three stages, SA1 to SA3 preferably satisfy a condition of SA1<SA2+SA3 where SA1 represents the sum of opening areas of the plurality of first gas discharge openings 24a, SA2 represents the sum of opening areas of the plurality of second gas discharge openings 24b, and SA3 represents the sum of opening areas of the plurality of third gas discharge openings 24a (in the present embodiment, SA1=4×S1, SA2=8×S2, and SA3=12× S3). Sum SA1 of the opening areas of the plurality of first gas discharge openings 24a is preferably smaller than the total sum of sum SA2 of the opening areas of the plurality of second gas discharge openings 24b and sum SA3 of the opening areas of the plurality of third gas discharge openings 24c. This is because, when the sum (SA1) of the opening areas of the plurality of first gas discharge openings 24a occupied in the total sum (that is, SA1+SA2+SA3) of the opening areas of the plurality of gas discharge openings 24 is large, it is difficult to maintain the internal pressure in combustion chamber 60 to the high-pressure state.

Figure 6:
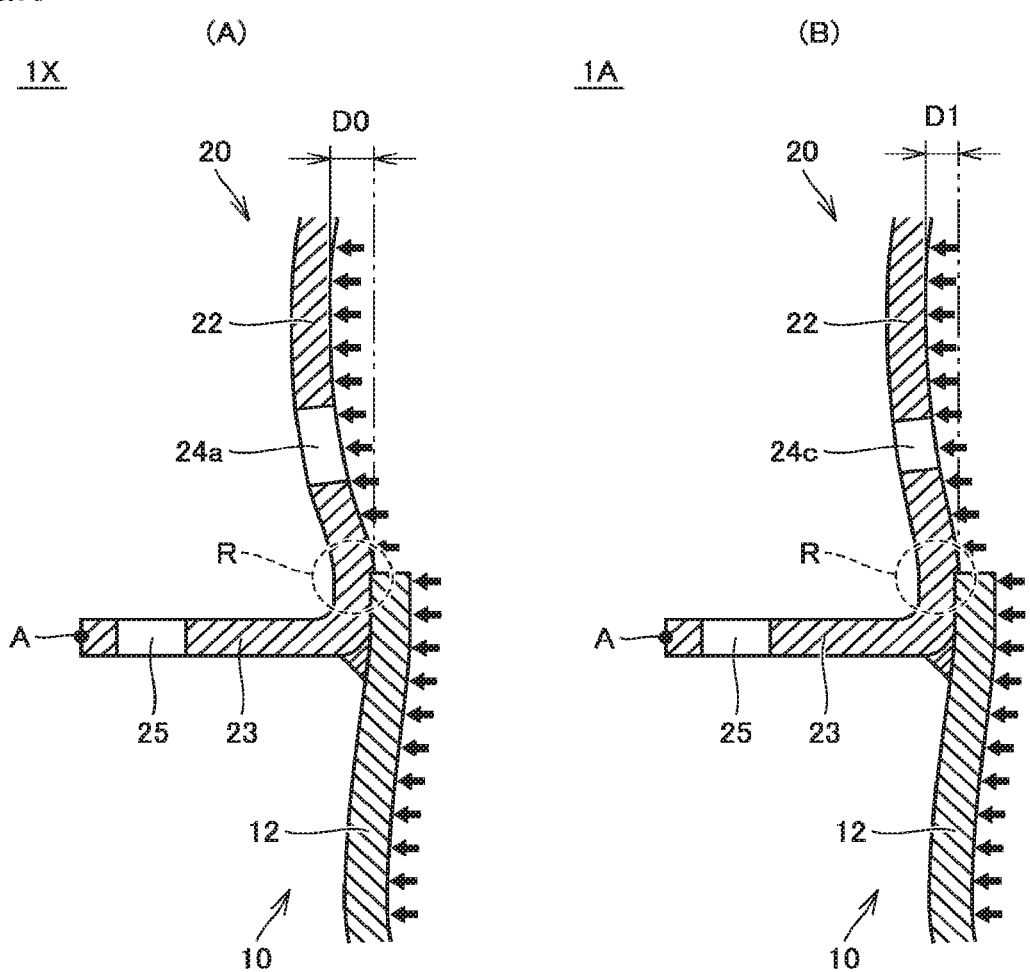
FIG. 6 schematically shows a difference in degree of deformation of a main portion of a housing at the time of activation between a disc-type gas generator according to a comparative example and the disc-type gas generator in the first embodiment of the present invention.

FIG. 6 (A) is a diagram schematically showing a degree of deformation of the main portion of the housing at the time of activation of a disc-type gas generator according to a comparative example and FIG. 6 (B) is a diagram schematically showing a degree of deformation of the main portion of the housing at the time of activation of the disc-type gas generator in the present embodiment. A reason why high pressure-resistant performance can be ensured even when the housing as a pressure-resistant container is decreased in thickness for reduction in size and weight in disc-type gas generator 1A in the present embodiment will be described in detail by explaining a difference in degree of deformation of the main portion of the housing at the time of activation between a disc-type gas generator 1X according to the comparative example and disc-type gas generator 1A in the present embodiment with reference to FIG. 6 and FIG. 2 described previously. The cross-section shown in FIG. 6 (B) is a cross-section along the line VIB-VIB shown in FIG. 3 of the housing of disc-type gas generator 1A in the present embodiment and the cross-section shown in FIG. 6 (A) is a cross-section corresponding to the cross-section shown in FIG. 6 (B) of the housing of disc-type gas generator 1X according to the comparative example.

In general, when a disc-type gas generator is activated, with increase in pressure in a space in the housing, the housing deforms as expanding outward, and accordingly, stress is locally concentrated at a prescribed portion of the housing. When a degree of deformation of the housing is relatively high and stress equal to or higher than a withstand pressure of the housing is produced at that portion, fracture of the housing starts from that portion. On the other hand, when a degree of deformation of the housing is relatively low and stress equal or higher than a withstand pressure of the housing is not produced in that portion, no fracture occurs in the housing and an operation by the disc-type gas generator is normally completed.

Referring to FIG. 2, examples of a portion where concentration of stress is likely include a portion of connection to flange portion 23, of cylindrical portion 22 of upper shell 20 (a portion shown with a region R in FIG. 2). Though cylindrical portion 22 is a portion which is relatively easily deformed with increase in pressure in the space in the housing, deformation of the portion of connection to flange portion 23 is restricted by flange portion 23 because flange portion 23 is less prone to deform. Consequently, large stress is produced in region R.

Furthermore, in region R, in the vicinity of maximum outer geometry position A (see FIG. 3) of flange portion 23, an amount of radially outward protrusion of flange portion 23 is particularly large. Therefore, strong restriction force by flange portion 23 described above is applied so that stress is produced in a more concentrated manner than in other portions of region R. Therefore, unless stress equal to or higher than a withstand pressure of the housing is produced in a portion of region R located in the vicinity of maximum outer geometry position A of flange portion 23, fracture of the housing does not basically occur.

When a plurality of gas discharge openings 24 including gas discharge openings different in opening area from one another are provided in cylindrical portion 22 of upper shell 20 as in disc-type gas generator 1A in the present embodiment, deformation of cylindrical portion 22 is relatively greater in the vicinity of a portion where a gas discharge opening larger in opening area is provided, and deformation of cylindrical portion 22 in the vicinity of a portion where a gas discharge opening smaller in opening area is provided is relatively small, which is attributed to the fact that mechanical strength of cylindrical portion 22 is relatively low in the vicinity of the portion where the gas discharge opening larger in opening area is provided and mechanical strength of cylindrical portion 22 is relatively high in the vicinity of the portion where the gas discharge opening smaller in opening area is provided.

Referring to FIG. 6 (A), disc-type gas generator 1X according to the comparative example is different from disc-type gas generator 1A in the present embodiment in that, when a perpendicular line is drawn from maximum outer geometry position A of flange portion 23 to the axial line of cylindrical portion 22, first gas discharge opening 24a largest in opening area among first gas discharge opening 24a, second gas discharge opening 24b, and third gas discharge opening 24c is arranged closest to the perpendicular line.

In disc-type gas generator 1X according to the comparative example thus constructed, first gas discharge opening 24a largest in opening area is provided in the vicinity of a portion of cylindrical portion 22 corresponding to maximum outer geometry position A of flange portion 23, so that a portion of cylindrical portion 22 relatively low in mechanical strength and a portion of cylindrical portion 22 to which strongest restriction force by flange portion 23 is applied are arranged as being superimposed in the circumferential direction of the housing.

Therefore, as shown in FIG. 6 (A), at the time of activation of disc-type gas generator 1X according to the comparative example, relatively large deformation occurs in a portion of cylindrical portion 22 corresponding to the above-described portion in region R corresponding to maximum outer geometry position A of flange portion 23 (that is, a large amount of deformation as shown with a reference D0 in the figure is produced in cylindrical portion 22), whereas strong restriction force by flange portion 23 is applied thereto. Consequently, stress is produced in that portion in region R in a concentrated manner.

Therefore, in disc-type gas generator 1X according to the comparative example, in order to avoid fracture of upper shell 20 in that portion, upper shell 20 should relatively be greater in thickness, which interferes reduction in size and weight.

In contrast, as shown in FIG. 6 (B), in disc-type gas generator 1A in the present embodiment, third gas discharge opening 24c smallest in opening area is provided in the vicinity of the portion of cylindrical portion 22 corresponding to maximum outer geometry position A of flange portion 23, so that a portion of cylindrical portion 22 relatively high in mechanical strength and a portion of cylindrical portion 22 to which strongest restriction force by flange portion 23 is applied are arranged as being superimposed in the circumferential direction of the housing.

Therefore, as shown in FIG. 6 (B), at the time of activation of disc-type gas generator 1A in the present embodiment, while strong restriction force by flange portion 23 is applied in the above-described portion in region R corresponding to maximum outer geometry position A of flange portion 23, the portion of cylindrical portion 22 corresponding to that portion merely suffers from relatively small deformation (that is, a small amount of deformation as shown with a reference D1 in the figure (that is, D1<D0) is produced in cylindrical portion 22). Consequently, concentration of stress that occurs in that portion in region R can significantly be lessened.

Therefore, disc-type gas generator 1A in the present embodiment can relatively be smaller in thickness of upper shell 20 than disc-type gas generator 1x according to the comparative example described above, and consequently, it can achieve reduction in size and weight.

Disc-type gas generator 1A in the present embodiment can thus implement a gas generator capable of achieving reduction in size and weight while ensuring pressure-resistant performance and capable of achieving lessening in difference in gas output performance due to an environmental temperature.

Referring to FIG. 3, in disc-type gas generator 1A in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 24 described above can be regarded as consisting of a plurality of groups of gas discharge openings below. The gas discharge openings are grouped such that one group of gas discharge openings consists of gas discharge openings as many as possible as described above.

First gas discharge opening group X: four gas discharge openings 24a in total arranged at a 90[°] interval Second gas discharge opening group Y: eight gas discharge openings 24b in total arranged at a 45[°] interval Third gas discharge opening group Z1: eight gas discharge openings 24c in total arranged at a 45[°] interval Third gas discharge opening group Z2: four gas discharge openings 24c in total arranged at a 90[°] interval In disc-type gas generator 1A in the present embodiment, the plurality of gas discharge openings 24 consist of four groups X, Y, Z1, and Z2 in total of gas discharge openings each group including a plurality of gas discharge openings set to be opened at an identical opening pressure and evenly arranged along the circumferential direction of cylindrical portion 22 in rotation symmetry at an angle not greater than 120[°] around axial line O of cylindrical portion 22 of upper shell 20.

According to such a construction, even though fixing force of an external member (for example, a retainer of the air bag apparatus) which fixes disc-type gas generator 1A is insufficient only at some positions in the circumferential direction of the housing (for example, lowering in fixing force due to aging), thrusts applied to disc-type gas generator 1A can be prevented from being significantly unbalanced.

More specifically, in the second stage after start of activation described above, four first gas discharge openings 24a evenly arranged along the circumferential direction of cylindrical portion 22 of upper shell 20 are opened so that the gas is discharged at four positions equidistant in the circumferential direction of cylindrical portion 22. Even though fixing force of the fixing member which fixes disc-type gas generator 1A is insufficient only at some positions in the circumferential direction of the housing, thrusts applied to disc-type gas generator 1A are relatively less likely to be unbalanced.

In the third stage after start of activation described above, first gas discharge openings 24a and second gas discharge openings 24b twelve in total substantially evenly arranged along the circumferential direction of cylindrical portion 22 of upper shell 20 are opened. Therefore, the gas is discharged at twelve positions substantially equidistant along the circumferential direction of cylindrical portion 22. Even though fixing force of the fixing member which fixes disc-type gas generator 1A is insufficient only at some positions in the circumferential direction of the housing, thrusts applied to disc-type gas generator 1A are considerably less likely to be unbalanced.

Therefore, by adopting the construction, a disc-type gas generator higher in safety in particular in an early stage after start of activation can be obtained.

Additionally, in the second and third stages after start of activation described above, the air bag has not yet sufficiently been developed and opened gas discharge openings 24 and the air bag are very close to each other. In that case as well, the gas is discharged as being distributed at four positions equidistant and twelve positions substantially equidistant along the circumferential direction of cylindrical portion 22 of upper shell 20. Therefore, impingement of the gas at a high temperature and a high pressure to a local portion of the air bag in a concentrated manner can be avoided. Therefore, by adopting the construction, the possibility of damage to the air bag can also be lowered.

This is attributed to substantially even arrangement of remaining all gas discharge openings (that is, all of first gas discharge openings 24a and second gas discharge openings 24b) except for gas discharge openings 24c included in third gas discharge opening groups Z1 and Z2 among the plurality of gas discharge openings 24 along the circumferential direction of cylindrical portion 22 of upper shell 20. In disc-type gas generator 1A in the present embodiment, all of the plurality of gas discharge openings 24 (that is, third gas discharge openings 24c in addition to first gas discharge openings 24a and second gas discharge openings 24b, altogether) are evenly arranged along the circumferential direction of cylindrical portion 22 of upper shell 20. Therefore, in the fourth stage after start of activation described above as well, the gas is also discharged as being distributed at twenty-four positions equidistant along the circumferential direction of cylindrical portion 22 of upper shell 20.

By adopting the construction, the number of gas discharge openings 24 can be increased while opening areas of the plurality of individual gas discharge openings 24 provided in the housing are suppressed. Therefore, a pressure in the space inside the housing at the time of activation can be lowered to a considerable extent within a range in which sustained combustion of gas generating agent 61 can be achieved in a stable manner. Therefore, in this sense as well, the housing can be decreased in thickness while pressure-resistant performance of the housing is ensured, and consequently significant reduction in size and weight of the disc-type gas generator can be realized.

Disc-type gas generator 1A in the present embodiment is of such a type as expanding and developing an air bag of a standard size. Cylindrical portion 22 of upper shell 20 is designed to have an outer diameter, for example, of 60.4 [mm] and a thickness (a plate thickness), for example, of 1.1 [mm].

In this case, length L1 and width W1 of first gas discharge opening 24a are set, for example, to 4.0 [mm] and 1.9 [mm], respectively, length L2 and width W2 of second gas discharge opening 24b are set, for example, to 3.3 [mm] and 1.4 [mm], respectively, and length L3 and width W3 of third gas discharge opening 24c are set, for example, to 2.5 [mm] and 1.3 [mm], respectively.

The plurality of gas discharge openings 24 are provided generally by punching with a pressing machine. In the design as above, however, a pitch between adjacent gas discharge openings 24 is small. Therefore, it is virtually impossible to provide the gas discharge openings by performing punching once due to restriction of the pressing machine.

From a point of view of reduction in manufacturing cost, however, all of the plurality of gas discharge openings 24 are preferably provided by performing punching as small a number of times as possible. Therefore, in manufacturing disc-type gas generator 1A constructed above, in a process for providing the plurality of gas discharge openings 24, preferably, twelve gas discharge openings in total arranged every 30[°] along the circumferential direction of cylindrical portion 22 are provided by performing punching once and twelve remaining gas discharge openings in total arranged every 30[°] along the circumferential direction of cylindrical portion 22 are provided by performing punching once. Thus, all of the plurality of gas discharge openings 24 can be provided by performing punching twice so that manufacturing cost can be reduced.

By shaping gas discharge opening 24 into an elongated hole as in the present embodiment described above, an actual opening area with gas discharge openings 24 being open can differ depending on a difference in environmental temperature (that is, in a low-temperature environment, a room-temperature environment, or a high-temperature environment), and burning of gas generating agent 61 can be promoted in particular in the low-temperature environment. Therefore, a difference in gas output performance due to an environmental temperature can remarkably be lessened and a disc-type gas generator higher in performance than in the conventional example can be obtained. This aspect will be described below in detail.

FIG. 7 is a diagram schematically showing a state in the vicinity of a gas discharge opening when the gas generator in the present embodiment is activated. FIG. 7 (A) shows an example in which the gas generator is activated in the room-temperature environment and in the high-temperature environment and FIG. 7 (B) shows an example in which the gas generator is activated in the low-temperature environment.

As shown in FIG. 7 (A), when disc-type gas generator 1A in the present embodiment is activated in the room-temperature environment and in the high-temperature environment, sealing tape 26 is completely broken along the opening edge portion of gas discharge opening 24 in a shape of an elongated hole in cleavage of sealing tape 26 in the portion closing gas discharge opening 24 with increase in internal pressure in combustion chamber 60, and broken sealing tape 26 does not adhere to the opening edge portion of gas discharge opening 24. Therefore, an opening area of gas discharge opening 24 and an actual opening area with gas discharge opening 24 being open as a result of cleavage of sealing tape 26 are equal to each other.

As shown in FIG. 7 (B), when disc-type gas generator 1A in the present embodiment is activated in the low-temperature environment, sealing tape 26 is broken along the opening edge portion of gas discharge opening 24 in a shape of an elongated hole in cleavage of sealing tape 26 in the portion closing gas discharge opening 24 with increase in internal pressure in combustion chamber 60, however, it is not completely broken along the entire periphery of the opening edge portion. The sealing tape is not broken along one of the pair of opening edge portions which extend in parallel along cylindrical portion 22 and broken sealing tape 26 adheres to the opening edge portion of gas discharge opening 24. Therefore, an actual opening area with gas discharge opening 24 being open as a result of cleavage of sealing tape 26 is smaller than an opening area of gas discharge opening 24 by an amount corresponding to a cross-sectional area of sealing tape 26.

Therefore, the relatively large total sum of actual opening areas of gas discharge openings 24 at the time of activation of disc-type gas generator 1A is ensured in the room-temperature environment and in the high-temperature environment, whereas the total sum of actual opening areas of gas discharge openings 24 at the time of activation of disc-type gas generator 1A is relatively decreased in the low-temperature environment. Thus, an amount of the gas emitted through gas discharge openings 24 as a result of opening of gas discharge openings 24 in the low-temperature environment is restricted as compared with the amount in the room-temperature environment and in the high-temperature environment, and increase in internal pressure in combustion chamber 60 is accordingly promoted. Therefore, burning of gas generating agent 61 can be promoted in particular in the low-temperature environment, so that a difference in gas output performance due to the environmental temperature can remarkably be lessened, and consequently, a disc-type gas generator higher in performance than in the conventional example can be obtained.

The reason why a difference as to whether or not a part of cleaved sealing tape 26 adheres to the opening edge portion of gas discharge opening 24 in accordance with an ambient temperature is caused by adopting the feature as in the present embodiment is exclusively estimated as follows. Since gas discharge opening 24 is in a shape of an elongated hole which is not an annular hole, a distance from the center of gas discharge opening 24 to the opening edge portion is not uniform. Then, instantaneous energy required to break sealing tape 26 at once along the opening edge portion increases. A rate of increase in internal pressure in combustion chamber 60 in the room-temperature environment and in the high-temperature environment is high, and hence instantaneous energy is obtained. On the other hand, a rate of increase in internal pressure in combustion chamber 60 is low in the low-temperature environment, and hence instantaneous energy is not obtained.

Though an example in which gas discharge opening 24 is provided as a track-shaped hole has been described by way of a typical example of the shape of the elongated hole in the present embodiment, the shape of gas discharge opening 24 is not limited thereto, but may be oval or rectangular. In order to more reliably obtain the effect described above, gas discharge opening 24 in the shape of the elongated hole preferably has a pair of opening edge portions which extend in parallel along cylindrical portion 22 and it is further preferably provided as a hole in a track shape or a rectangular shape described above.

Though an example in which all of the plurality of gas discharge openings 24 are constructed into a shape of a vertically elongated hole has been described by way of example in the present embodiment, a considerable effect can be obtained also when only some of the plurality of gas discharge openings 24 are constructed into a shape of a vertically elongated hole, and an effect substantially the same as the effect described above can be obtained also when all or some of the plurality of gas discharge openings 24 are constructed into a shape of a laterally elongated hole. The shape of a laterally elongated hole refers to such a shape of an elongated hole that an opening width along the circumferential direction of cylindrical portion 22 of upper shell 20 is greater than an opening width along the axial direction of cylindrical portion 22.

Though an example in which the plurality of gas discharge openings 24 are arranged as being aligned along the circumferential direction of cylindrical portion 22 of upper shell 20 has been described by way of example in the present embodiment, the gas discharge openings may be arranged as being staggered or in a plurality of rows or in another layout.

The low-temperature environment, the room-temperature environment, and the high-temperature environment described above refer to an environment at a temperature around −40[° C.], an environment at a temperature around 20[° C.], and an environment at a temperature around 85[° C.], respectively.

Second Embodiment

Figure 8:
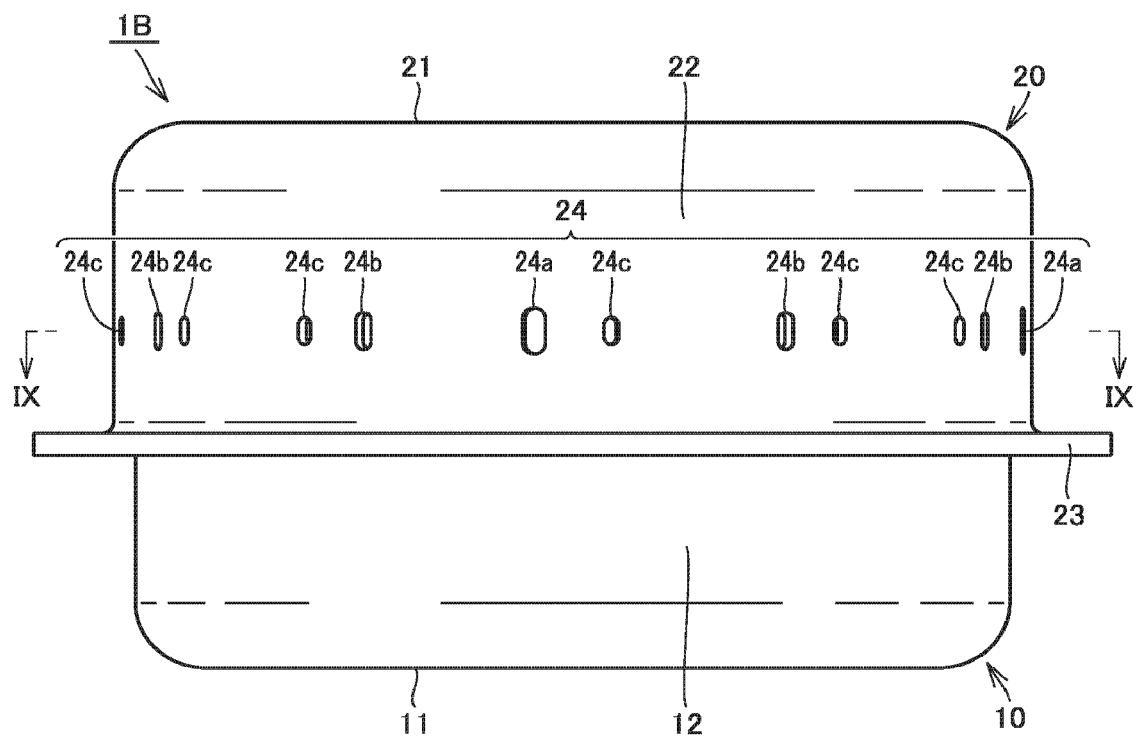
FIG. 8 is a front view of a disc-type gas generator in a second embodiment of the present invention.
Figure 9:
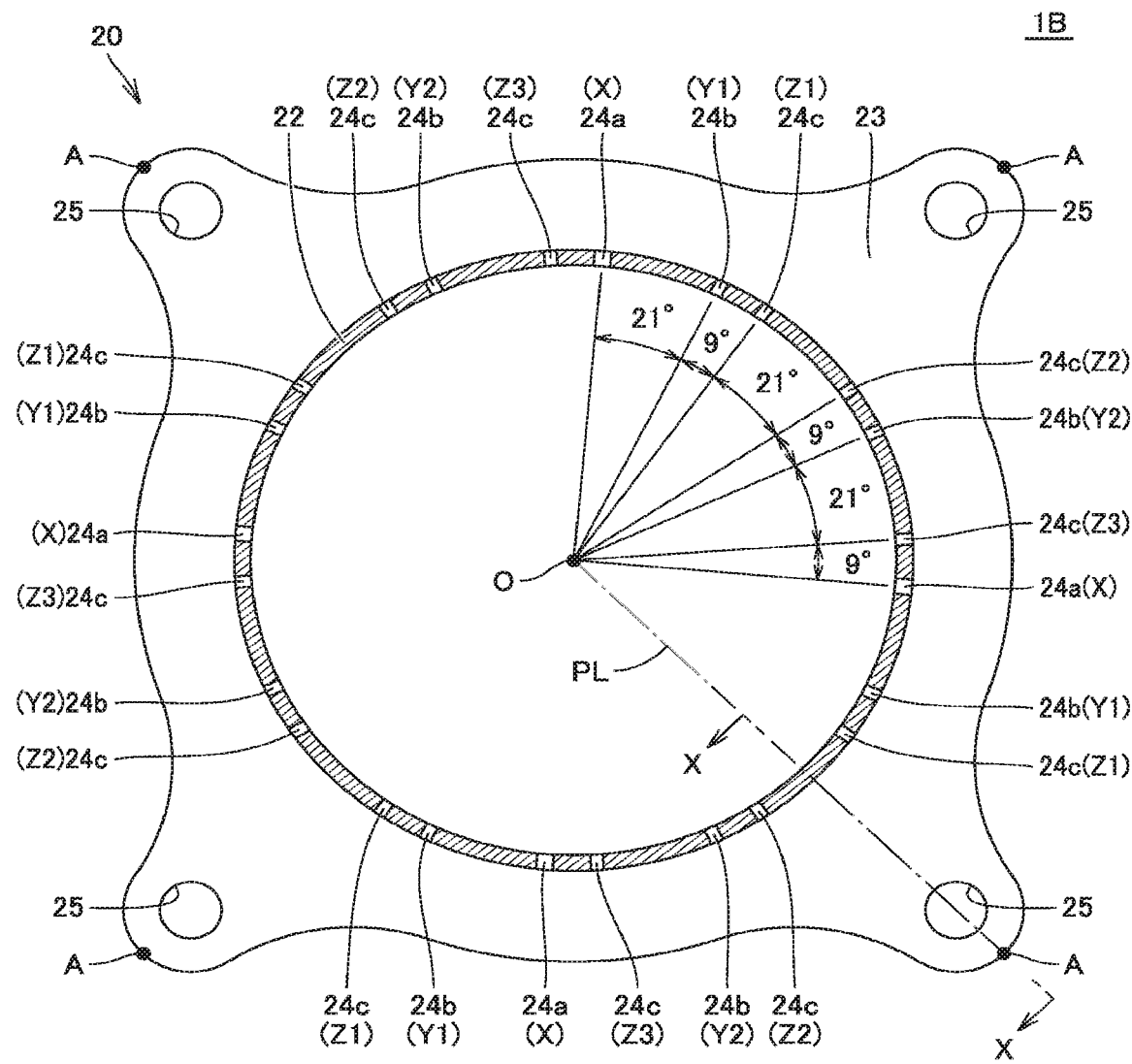

FIG. 8 is a front view of a disc-type gas generator in a second embodiment of the present invention and FIG. 9 is a cross-sectional view of the upper shell along the line IX-IX shown in FIG. 8. A construction of disc-type gas generator 1B in the present embodiment will initially be described with reference to FIGS. 8 and 9.

Disc-type gas generator 1B in the present embodiment is of a type of expanding and developing an air bag of the standard size similarly to disc-type gas generator 1A in the first embodiment described above, and first gas discharge openings 24a, second gas discharge openings 24b, and third gas discharge openings 24c (see FIGS. 1 and 4) similar in shape and size to those in disc-type gas generator 1A in the first embodiment described above are provided in cylindrical portion 22 of upper shell 20 as shown in FIGS. 8 and 9.

In the present embodiment, first gas discharge opening 24a, second gas discharge opening 24b, and third gas discharge opening 24c are provided as being aligned under a prescribed rule along the circumferential direction of cylindrical portion 22 of upper shell 20 (a rule different from the rule shown in the first embodiment described above). More specifically, twenty-four gas discharge openings 24 in total are arranged every prescribed angle along the circumferential direction of cylindrical portion 22 of upper shell 20.

Four first gas discharge openings 24a are provided and arranged every 90[°] along the circumferential direction of cylindrical portion 22 of upper shell 20. Eight second gas discharge openings 24b are provided and arranged at intervals of 39[°], 51[°], 39[°], 51[°], along the circumferential direction of cylindrical portion 22 of upper shell 20. Twelve third gas discharge openings 24c are provided and arranged at intervals of 21[°], 30[°], 39[°], 21[°], 30[°], 39[°], . . . along the circumferential direction of cylindrical portion 22 of upper shell 20.

First gas discharge opening 24a, second gas discharge opening 24b, and third gas discharge opening 24c are arranged along the circumferential direction of cylindrical portion 22 of upper shell 20 in the order of first gas discharge opening 24a, second gas discharge opening 24b, third gas discharge opening 24c, third gas discharge opening 24c, second gas discharge opening 24b, and third gas discharge opening 24c, with this set being defined as one set and with four sets as such being repeated. The plurality of gas discharge openings 24 are thus arranged so as not to overlap with each other in the circumferential direction of cylindrical portion 22 of upper shell 20.

Intervals of arrangement among gas discharge openings 24 arranged in the order of first gas discharge opening 24a, second gas discharge opening 24b, third gas discharge opening 24c, third gas discharge opening 24c, second gas discharge opening 24b, third gas discharge opening 24c, first gas discharge opening 24a, . . . described above are set sequentially to 21[°], 9[°], 21[°], 9[°], 21[°], 9[°], . . . as illustrated.

Referring to FIG. 9, in disc-type gas generator 1B in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 24 described above can be regarded as consisting of a plurality of groups of gas discharge openings below. The gas discharge openings are grouped such that one group of gas discharge openings consists of gas discharge openings as many as possible as described above.

First gas discharge opening group X: four gas discharge openings 24a in total arranged at a 90[°] interval Second gas discharge opening group [°]: four gas discharge openings 24b in total arranged at a 90[°] interval
Second gas discharge opening group Y2: four gas discharge openings 24b in total arranged at a 90[°] interval Third gas discharge opening group Z1: four gas discharge openings 24c in total arranged at a 90[°] interval
Third gas discharge opening group Z2: four gas discharge openings 24c in total arranged at a 90[°] interval
Third gas discharge opening group Z3: four gas discharge openings 24c in total arranged at a 90[°] interval In disc-type gas generator 1B in the present embodiment, the plurality of gas discharge openings 24 consist of six groups X, Y1, Y2, Z1, Z2, and Z3 in total of gas discharge openings each group including a plurality of gas discharge openings set to be opened at an identical opening pressure and evenly arranged along the circumferential direction of cylindrical portion 22 in rotation symmetry at an angle not greater than 120[°] around the axial line of cylindrical portion 22 of upper shell 20.

As shown in FIG. 9, in disc-type gas generator 1B in the present embodiment, when perpendicular line PL is drawn from maximum outer geometry position A of flange portion 23 to axial line O of cylindrical portion 22 (FIG. 9 representatively showing an example in which perpendicular line PL is drawn from one of four maximum outer geometry positions A), among first gas discharge opening 24a, second gas discharge opening 24b, and third gas discharge opening 24c, a gas discharge opening other than first gas discharge opening 24a largest in opening area is arranged closest to perpendicular line PL.

More specifically, when viewed along axial line O of cylindrical portion 22, no gas discharge opening 24 is provided at a position in cylindrical portion 22 superimposed on perpendicular line PL (that is, none of the plurality of gas discharge openings 24a to 24c are arranged at a position on a plane including perpendicular line PL and axial line O of cylindrical portion 22), and third gas discharge opening 24c is arranged at a position closest to an intersection between cylindrical portion 22 and perpendicular line PL. Thus, among first gas discharge opening 24a, second gas discharge opening 24b, and third gas discharge openings 24, it is third gas discharge opening 24c smallest in opening area that is arranged closest to perpendicular line PL.

Figure 10:
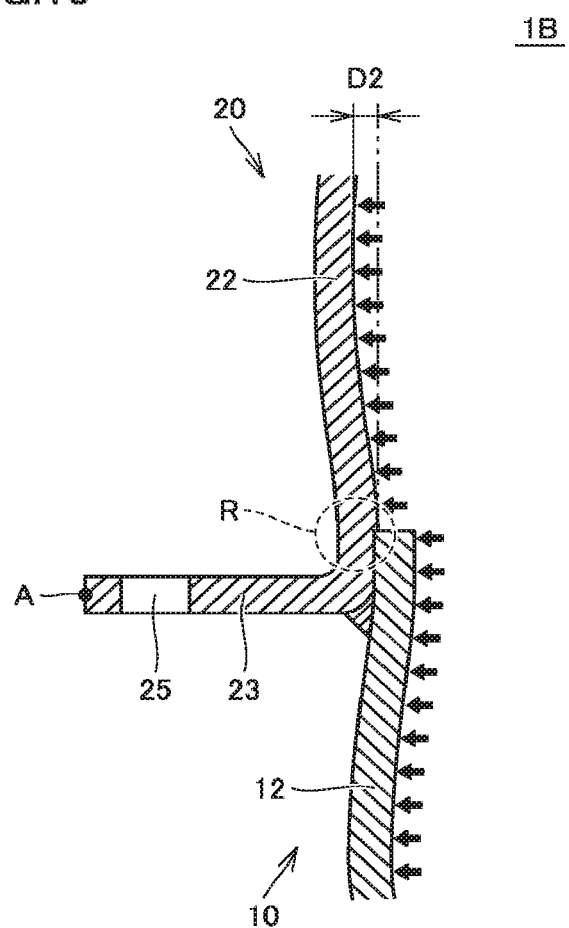
FIG. 10 schematically shows a degree of deformation of the main portion of the housing at the time of activation of the disc-type gas generator in the second embodiment of the present invention.

FIG. 10 is a diagram schematically showing a degree of deformation of the main portion of the housing at the time of activation of the disc-type gas generator in the present embodiment. A degree of deformation of the main portion of the housing at the time of activation of disc-type gas generator 1B in the present embodiment will now be described with reference to FIG. 10. The cross-section shown in FIG. 10 is a cross-section along the line X-X shown in FIG. 9 of the housing of disc-type gas generator 1B in the present embodiment.

Referring to FIG. 9, disc-type gas generator 1B in the present embodiment is constructed such that a region where none of the plurality of gas discharge openings 24 are arranged is provided to a certain extent along the circumferential direction of cylindrical portion 22, this region is arranged to include the intersection between cylindrical portion 22 and perpendicular line PL, and third gas discharge opening 24c smallest in opening area is arranged closest to perpendicular line PL. Therefore, in a portion of cylindrical portion 22 in the vicinity of the intersection with perpendicular line PL, mechanical strength of cylindrical portion 22 is relatively higher than in other portions.

Therefore, as shown in FIG. 10, at the time of activation of disc-type gas generator 1B in the present embodiment, while strong restriction force by flange portion 23 is applied in the portion in region R corresponding to maximum outer geometry position A of flange portion 23, a portion of cylindrical portion 22 corresponding to that portion merely suffers from relatively small deformation (that is, a small amount of deformation as shown with a reference D2 in the figure (that is, D2<D1)(see FIG. 6 (B) for D1) is produced in cylindrical portion 22). Consequently, concentration of stress that occurs in that portion in region R can drastically be lessened.

Therefore, disc-type gas generator 1B in the present embodiment can relatively further be smaller in thickness of upper shell 20 than disc-type gas generator 1A in the first embodiment described above, and consequently it can achieve further reduction in size and weight.

Disc-type gas generator 1B in the present embodiment is of such a type as expanding and developing an air bag of the standard size as described above. Cylindrical portion 22 of upper shell 20 is designed to have an outer diameter, for example, of 60.4 [mm] and a thickness (a plate thickness), for example, of 1.1 [mm].

In this case, length L1 and width W1 of first gas discharge opening 24a are set, for example, to 4.0 [mm] and 1.9 [mm], respectively, length L2 and width W2 of second gas discharge opening 24b are set, for example, to 3.3 [mm] and 1.4 [mm], respectively, and length L3 and width W3 of third gas discharge opening 24c are set, for example, to 2.5 [mm] and 1.3 [mm], respectively.

When the construction is adopted as well, twelve gas discharge openings in total included in one first gas discharge opening group X, one third gas discharge opening group Z1, and one second gas discharge opening group Y2 are provided by performing punching once and twelve gas discharge openings in total included in one second gas discharge opening group Y1, one third gas discharge opening group Z2, and one third gas discharge opening group Z3 are provided by performing punching once so that all of the plurality of gas discharge openings 24 can be provided by performing punching twice in total and manufacturing cost also in consideration of restrictions imposed by a pressing machine can be minimized.

Third Embodiment

Figure 11:
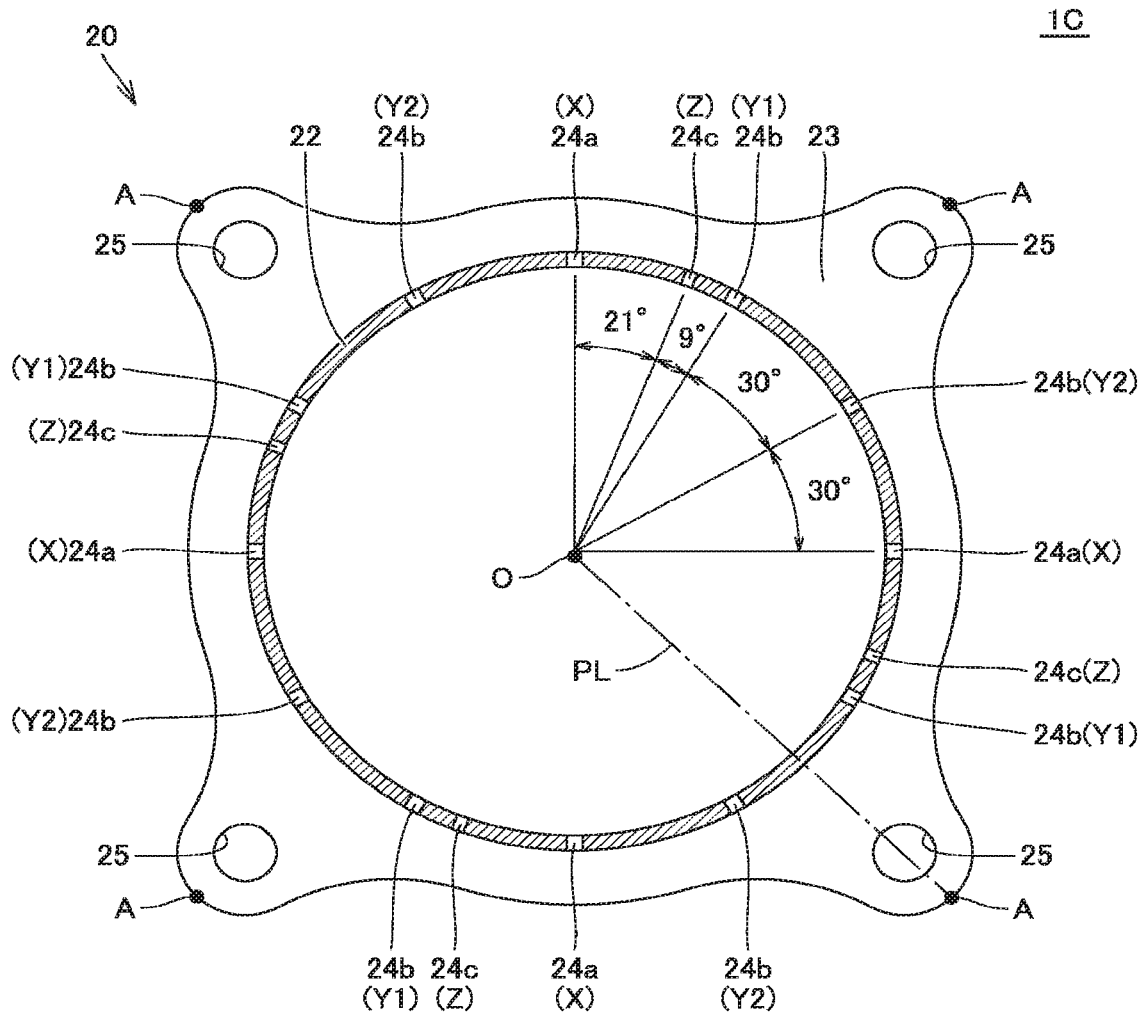
FIG. 11 is a cross-sectional view of the upper shell in a disc-type gas generator in a third embodiment of the present invention.
Figure 12:
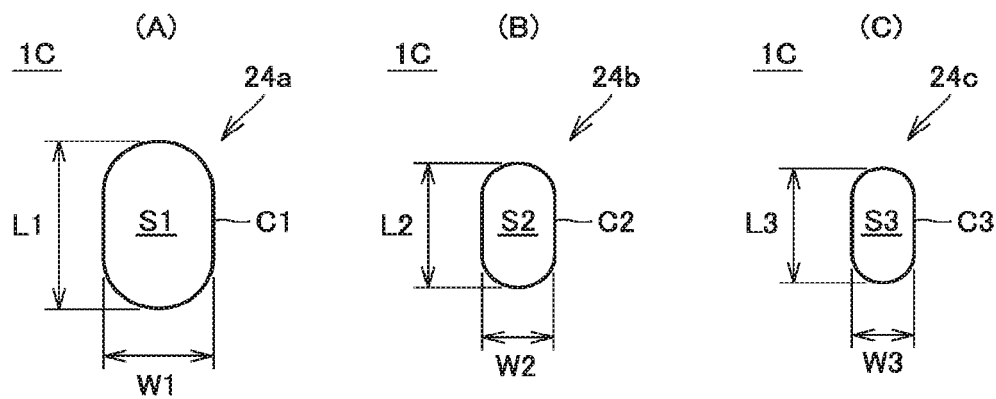

FIG. 11 is a cross-sectional view of the upper shell in a disc-type gas generator in a third embodiment of the present invention and FIG. 12 is an enlarged view of the first to third gas discharge openings shown in FIG. 11. A disc-type gas generator 1C in the third embodiment of the present invention will be described below with reference to FIGS. 11 and 12.

Unlike disc-type gas generator 1B in the second embodiment described above, disc-type gas generator 1C in the present embodiment is of a type of expanding and developing a small-sized air bag smaller than the standard size. As shown in FIG. 11, gas discharge openings 24 smaller in number than in disc-type gas generator 1B in the second embodiment described above are provided in cylindrical portion 22 of upper shell 20.

Specifically, as shown in FIG. 11, first gas discharge opening 24a, second gas discharge opening 24b, and third gas discharge opening 24c are provided as being aligned under a prescribed rule along the circumferential direction of cylindrical portion 22 of upper shell 20 (a rule different from the rule shown in the second embodiment described above). More specifically, sixteen gas discharge openings 24 in total are arranged every prescribed angle along the circumferential direction of cylindrical portion 22 of upper shell 20.

Four first gas discharge openings 24a are provided and arranged every 90[°] along the circumferential direction of cylindrical portion 22 of upper shell 20. Eight second gas discharge openings 24b are provided and arranged at intervals of 30[°], 60[°], 30[°], 60[°], . . . along the circumferential direction of cylindrical portion 22 of upper shell 20. Four third gas discharge openings 24c are provided and arranged at every 90[°] along the circumferential direction of cylindrical portion 22 of upper shell 20.

First gas discharge opening 24a, second gas discharge opening 24b, and third gas discharge opening 24c are arranged along the circumferential direction of cylindrical portion 22 of upper shell 20 in the order of first gas discharge opening 24a, third gas discharge opening 24c, second gas discharge opening 24b, and second gas discharge opening 24b, with this set being defined as one set and with four sets as such being repeated. The plurality of gas discharge openings 24 are thus arranged so as not to overlap with each other in the circumferential direction of cylindrical portion 22 of upper shell 20.

Intervals of arrangement among gas discharge openings 24 arranged in the order of first gas discharge opening 24a, third gas discharge opening 24c, second gas discharge opening 24b, second gas discharge opening 24b, first gas discharge opening 24a, . . . described above are set sequentially to 21[°], 9[°], 30[°], 30[°], . . . as illustrated.

Referring to FIG. 11, in disc-type gas generator 1C in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 24 described above can be regarded as consisting of a plurality of groups of gas discharge openings below. The gas discharge openings are grouped such that one group of gas discharge openings consists of gas discharge openings as many as possible as described above.

First gas discharge opening group X: four gas discharge openings 24a in total arranged at a 90[°] interval Second gas discharge opening group [°]: four gas discharge openings 24b in total arranged at a 90[°] interval Second gas discharge opening group Y2: four gas discharge openings 24b in total arranged at a 90[°] interval Third gas discharge opening group Z: four gas discharge openings 24c in total arranged at a 90[°] interval In disc-type gas generator 1C in the present embodiment, the plurality of gas discharge openings 24 consist of four groups X, Y1, Y2, and Z in total of gas discharge openings each group including a plurality of gas discharge openings set to be opened at an identical opening pressure and evenly arranged along the circumferential direction of cylindrical portion 22 in rotation symmetry at an angle not greater than 120[°] around the axial line of cylindrical portion 22 of upper shell 20.

As shown in FIG. 11, in disc-type gas generator 1C in the present embodiment as well, when perpendicular line PL is drawn from maximum outer geometry position A of flange portion 23 to axial line O of cylindrical portion 22 (FIG. 11 representatively showing an example in which perpendicular line PL is drawn from one of four maximum outer geometry positions A), among first gas discharge opening 24a, second gas discharge opening 24b, and third gas discharge opening 24c, a gas discharge opening other than first gas discharge opening 24a largest in opening area is arranged closest to perpendicular line PL.

More specifically, when viewed along axial line O of cylindrical portion 22, no gas discharge opening 24 is provided at a position in cylindrical portion 22 superimposed on perpendicular line PL (that is, none of the plurality of gas discharge openings 24a to 24c are arranged at a position on a plane including perpendicular line PL and axial line O of cylindrical portion 22), and second gas discharge opening 24b is arranged at a position closest to the intersection between cylindrical portion 22 and perpendicular line PL. Thus, among first gas discharge opening 24a, second gas discharge opening 24b, and third gas discharge opening 24c, it is second gas discharge opening 24b second smallest in opening area that is arranged closest to perpendicular line PL.

Therefore, disc-type gas generator 1C in the present embodiment similarly to disc-type gas generator 1B in the second embodiment described above can drastically lessen occurrence of concentration of stress in a prescribed portion (in particular, the above-described portion in region R corresponding to maximum outer geometry position A of flange portion 23) of upper shell 20 at the time of activation. Therefore, by adopting the construction, a thickness of upper shell 20 can relatively be smaller, and consequently reduction in size and weight can be achieved.

Disc-type gas generator 1C in the present embodiment is of such a type as expanding and developing a small-sized air bag smaller than the standard size as described above. Cylindrical portion 22 of upper shell 20 is designed to have an outer diameter, for example, of 57.5 [mm] and a thickness (a plate thickness), for example, of 1.1 [mm].

In this case, referring to FIG. 12, length L1 and width W1 of first gas discharge opening 24a are set, for example, to 3.5 [mm] and 2.1 [mm], respectively, length L2 and width W2 of second gas discharge opening 24b are set, for example, to 2.6 [mm] and 1.4 [mm], respectively, and length L3 and width W3 of third gas discharge opening 24c are set, for example, to 2.4 [mm] and 1.2 [mm], respectively.

By adopting the construction as well, twelve gas discharge openings in total included in one first gas discharge opening group X and two second gas discharge opening groups Y1 and Y2 are provided by performing punching once and four gas discharge openings in total included in one third gas discharge opening group Z are provided by performing punching once so that all of the plurality of gas discharge openings 24 can be provided by performing punching twice in total and manufacturing cost in consideration of restrictions imposed by a pressing machine can be minimized.

Fourth Embodiment

Figure 13:
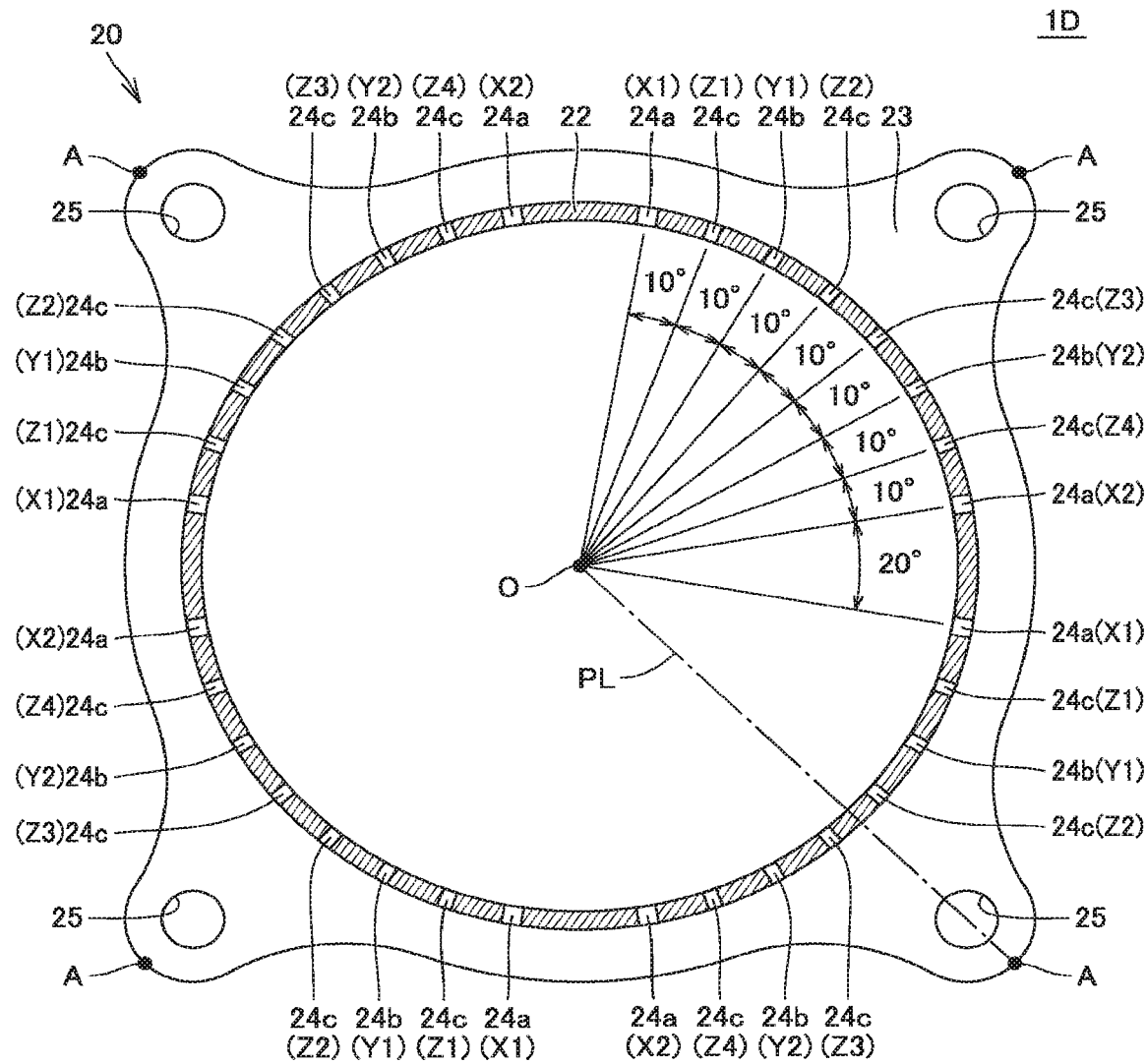
FIG. 13 is a cross-sectional view of the upper shell in a disc-type gas generator in a fourth embodiment of the present invention.
Figure 14:
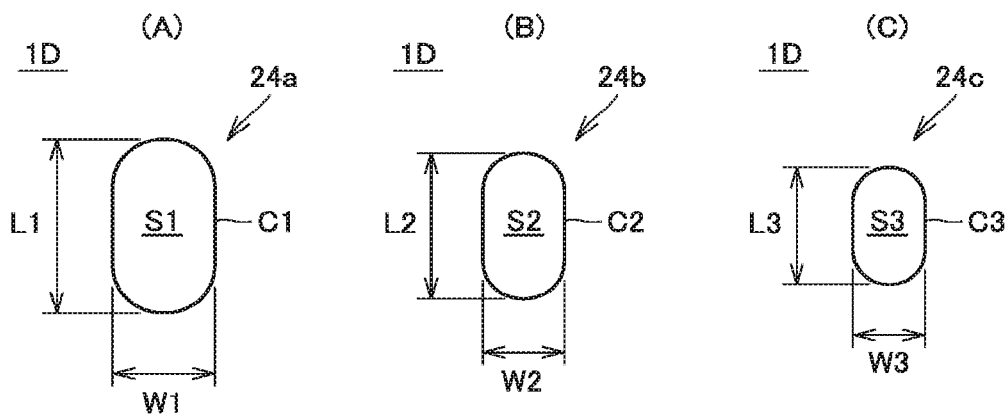
FIG. 14 is an enlarged view of the first to third gas discharge openings shown in FIG. 13.

FIG. 13 is a cross-sectional view of the upper shell in a disc-type gas generator in a fourth embodiment of the present invention and FIG. 14 is an enlarged view of the first to third gas discharge openings shown in FIG. 13. A disc-type gas generator 1D in the fourth embodiment of the present invention will be described below with reference to FIGS. 13 and 14.

Unlike disc-type gas generator 1B in the second embodiment described above, disc-type gas generator 1D in the present embodiment is of a type of expanding and developing a large-sized air bag larger than the standard size. As shown in FIG. 13, gas discharge openings 24 greater in number than in disc-type gas generator 1B in the second embodiment described above are provided in cylindrical portion 22 of upper shell 20.

Specifically, as shown in FIG. 13, first gas discharge opening 24a, second gas discharge opening 24b, and third gas discharge opening 24c are provided as being aligned under a prescribed rule along the circumferential direction of cylindrical portion 22 of upper shell 20 (a rule different from the rule shown in the second embodiment described above). More specifically, thirty-two gas discharge openings 24 in total are arranged every prescribed angle along the circumferential direction of cylindrical portion 22 of upper shell 20.

Eight first gas discharge openings 24a are provided and arranged at intervals of 70[°], 20[°], 70[°], 20[°], . . . along the circumferential direction of cylindrical portion 22 of upper shell 20. Eight second gas discharge openings 24b are provided and arranged at intervals of 30[°], 60[°], 30[°], 60[°], . . . along the circumferential direction of cylindrical portion 22 of upper shell 20. Sixteen third gas discharge openings 24c are provided and arranged at intervals of 20[°], 10[°], 20[°], 40[°], 20 [°], 10[°], 20[°], 40[°], . . . along the circumferential direction of cylindrical portion 22 of upper shell 20.

First gas discharge opening 24a, second gas discharge opening 24b, and third gas discharge opening 24c are arranged along the circumferential direction of cylindrical portion 22 of upper shell 20 in the order of first gas discharge opening 24a, third gas discharge opening 24c, second gas discharge opening 24b, third gas discharge opening 24c, third gas discharge opening 24c, second gas discharge opening 24b, third gas discharge opening 24c, and first gas discharge opening 24a, with this set being defined as one set and with four sets as such being repeated. The plurality of gas discharge openings 24 are thus arranged so as not to overlap with each other in the circumferential direction of cylindrical portion 22 of upper shell 20.

Intervals of arrangement among gas discharge openings 24 arranged in the order of first gas discharge opening 24a, third gas discharge opening 24c, second gas discharge opening 24b, third gas discharge opening 24c, third gas discharge opening 24c, second gas discharge opening 24b, third gas discharge opening 24c, first gas discharge opening 24a, first gas discharge opening 24a, . . . described above are set sequentially to 10[°], 10[°], 10[°], 10[°], 10[°], 10[°], 10[°], 20[°], . . . as illustrated.

Referring to FIG. 13, in disc-type gas generator 1D in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 24 described above can be regarded as consisting of a plurality of groups of gas discharge openings below. The gas discharge openings are grouped such that one group of gas discharge openings consists of gas discharge openings as many as possible as described above.

First gas discharge opening group X1: four gas discharge openings 24a in total arranged at a 90[°] interval First gas discharge opening group X2: four gas discharge openings 24a in total arranged at a 90[°] interval Second gas discharge opening group Y1: four gas discharge openings 24b in total arranged at a 90[°] interval Second gas discharge opening group Y2: four gas discharge openings 24b in total arranged at a 90[°] interval Third gas discharge opening group Z1: four gas discharge openings 24c in total arranged at a 90[°] interval Third gas discharge opening group Z2: four gas discharge openings 24c in total arranged at a 90[°] interval Third gas discharge opening group Z3: four gas discharge openings 24c in total arranged at a 90 [C] interval Third gas discharge opening group Z4: four gas discharge openings 24c in total arranged at a 90[°] interval In disc-type gas generator 1D in the present embodiment, the plurality of gas discharge openings 24 consist of eight groups X1, X2, Y1, Y2, Z1, Z2, Z3, and Z4 in total of gas discharge openings each group including a plurality of gas discharge openings set to be opened at an identical opening pressure and evenly arranged along the circumferential direction of cylindrical portion 22 in rotation symmetry at an angle not greater than 120[°] around the axial line of cylindrical portion 22 of upper shell 20.

As shown in FIG. 13, in disc-type gas generator 1D in the present embodiment as well, when perpendicular line PL is drawn from maximum outer geometry position A of flange portion 23 to axial line O of cylindrical portion 22 (FIG. 13 representatively showing an example in which perpendicular line PL is drawn from one of four maximum outer geometry positions A), among first gas discharge opening 24a, second gas discharge opening 24b, and third gas discharge opening 24c, a gas discharge opening other than first gas discharge opening 24a largest in opening area is arranged closest to perpendicular line PL.

More specifically, when viewed along axial line O of cylindrical portion 22, no gas discharge opening 24 is provided at a position in cylindrical portion 22 superimposed on perpendicular line PL (that is, none of the plurality of gas discharge openings 24a to 24c are arranged at a position on a plane including perpendicular line PL and axial line O of cylindrical portion 22), and third gas discharge opening 24c is arranged at a position closest to the intersection between cylindrical portion 22 and perpendicular line PL. Thus, among first gas discharge opening 24a, second gas discharge opening 24b, and third gas discharge opening 24c, it is third gas discharge opening 24c smallest in opening area that is arranged closest to perpendicular line PL.

Therefore, disc-type gas generator 1D in the present embodiment similarly to disc-type gas generator 1B in the second embodiment described above can drastically lessen occurrence of concentration of stress in a prescribed portion (in particular, the above-described portion in region R corresponding to maximum outer geometry position A of flange portion 23) of upper shell 20 at the time of activation. Therefore, by adopting the construction, a thickness of upper shell 20 can relatively be smaller, and consequently reduction in size and weight can be achieved.

Disc-type gas generator 1D in the present embodiment is of such a type as expanding and developing a large-sized air bag larger than the standard size as described above. Cylindrical portion 22 of upper shell 20 is designed to have an outer diameter, for example, of 70.0 [mm] and a thickness (a plate thickness), for example, of 1.3 [mm].

In this case, referring to FIG. 14, length L1 and width W1 of first gas discharge opening 24a are set, for example, to 3.7 [mm] and 2.0 [mm], respectively, length L2 and width W2 of second gas discharge opening 24b are set, for example, to 3.1 [mm] and 1.6 [mm], respectively, and length L3 and width W3 of third gas discharge opening 24c are set, for example, to 2.5 [mm] and 1.4 [mm], respectively.

By adopting the construction as well, twelve gas discharge openings in total included in one first gas discharge opening group X1 and two third gas discharge opening groups Z2 and Z4 are provided by performing punching once, twelve gas discharge openings in total included in two third gas discharge opening groups Z1 and Z3 and one first gas discharge opening group X2 are provided by performing punching once, and eight gas discharge openings in total included in two second gas discharge opening groups Y1 and Y2 are provided by performing punching once so that all of the plurality of gas discharge openings 24 can be provided by performing punching three times in total and manufacturing cost in consideration of restrictions imposed by a pressing machine can be minimized.

Other Embodiments

Though an example in which a plurality of gas discharge openings and a flange portion are provided in the upper shell is described by way of example in the first to fourth embodiments of the present invention above, they may be provided in the lower shell.

Though an example in which the housing is constituted of a pair of shell members consisting of the upper shell and the lower shell is described by way of example in the first to fourth embodiments of the present invention above, the housing can naturally be constituted of three or more shell members.

Though an example in which three types of gas discharge openings are provided in the housing as a plurality of gas discharge openings including gas discharge openings different in opening area from one another is described by way of example in the first to fourth embodiments of the present invention above, two types of gas discharge openings or four or more types of gas discharge openings may be provided as a plurality of gas discharge openings.

Though an example in which a plurality of gas discharge openings are provided in the housing under a prescribed regular rule is described by way of example in the first to fourth embodiments of the present invention above, a plurality of gas discharge openings provided in the housing do not necessarily have to be provided under a regular rule.

Furthermore, a shape, a size, or a layout of gas discharge openings disclosed in the first to fourth embodiments of the present invention described above can variously be modified without departing from the gist of the present invention.

The embodiments disclosed herein are thus illustrative and non-restrictive in every respect. The technical scope of the present invention is delimited by the terms of the claims and includes any modifications within the scope and meaning equivalent to the terms of the claims.

REFERENCE SIGNS LIST 1A to 1D disc-type gas generator; 10 lower shell; 11 bottom plate portion; 12 cylindrical portion; 13 protruding cylindrical portion; 14 depression portion; 15 opening; 20 upper shell; 21 top plate portion; 22 cylindrical portion; 23 flange portion; 24 gas discharge opening; 24a first gas discharge opening; 24b second gas discharge opening; 24c third gas discharge opening; 25 through hole; 26 sealing tape; 28 gap; 30 holding portion; 31 inner cover portion; 32 outer cover portion; 33 coupling portion; 34 female connector portion; 40 igniter; 41 ignition portion; 42 terminal pin; 50 cup-shaped member; 51 top wall portion; 52 sidewall portion; 53 extension portion; 54 tip end portion; 55 enhancer chamber; 56 enhancer agent; 60 combustion chamber; 61 gas generating agent; 70 lower supporting member; 71 bottom portion; 72 abutment portion; 73 tip end portion; 80 upper supporting member; 81 bottom portion; 82 abutment portion; 85 cushion material; 90 filter; A maximum outer geometry position; O axial line; PL perpendicular line

The invention claimed is:

1. A gas generator comprising:
a housing having a circumferential wall portion, a top plate portion, and a bottom plate portion, the housing having opposing axial ends of the circumferential wall portion closed by the top plate portion and the bottom plate portion;
a gas generating agent arranged in the housing, the gas generating agent generating gas by being burnt; and
an igniter assembled to the housing, for burning the gas generating agent,
the housing being constructed by combining and joining a plurality of shell members,
one of the plurality of shell members including at least a cylindrical portion which forms at least a part of the circumferential wall portion and a flange portion continuously extending radially outward from one axial end of the cylindrical portion,
the cylindrical portion being provided with a plurality of gas discharge openings including gas discharge openings different in opening area from one another,
the flange portion being shaped such that a distance from an axial line of the cylindrical portion to an outer edge of the flange portion is non-uniform,
when a perpendicular line is drawn to the axial line of the cylindrical portion from a maximum outer geometry position in the outer edge of the flange portion most distant from the axial line of the cylindrical portion, none of the plurality of gas discharge openings are arranged at a position on a plane including the perpendicular line and the axial line of the cylindrical portion, and a pair of gas discharge openings arranged closest to the perpendicular line such that the perpendicular line lies between the pair of gas discharge openings satisfying a condition that each of the pair of gas discharge openings is a gas discharge opening other than a gas discharge opening largest in opening area among the plurality of gas discharge openings
a plurality of the maximum outer geometry positions are positioned along a circumferential direction of the cylindrical portion, and
the condition is satisfied for each of the portions corresponding to the plurality of the maximum outer geometry positions.

2. The gas generator according to claim 1, wherein
the flange portion is provided with a through hole for fixing the gas generator to an external member, and
the distance from the axial line of the cylindrical portion to the outer edge of the flange portion is longer in a portion of the flange portion provided with the through hole than in a portion of the flange portion where no through hole is provided.

3. The gas generator according to claim 1, wherein
the plurality of gas discharge openings are arranged as being aligned along the circumferential direction of the cylindrical portion.

4. The gas generator according to claim 1, wherein
the housing includes as the plurality of shell members, a cylindrical upper shell with bottom which forms the top plate portion and the circumferential wall portion close to the top plate portion and a cylindrical lower shell with bottom which forms the bottom plate portion and the circumferential wall portion close to the bottom plate portion, the cylindrical portion provided with the plurality of gas discharge openings is defined by a portion of the upper shell which forms the circumferential wall portion close to the top plate portion, the flange portion is provided as extending from an end portion of the upper shell on a side of the bottom plate portion in the portion which forms the circumferential wall portion close to the top plate portion, the upper shell and the lower shell are combined by inserting a portion of the lower shell which forms the circumferential wall portion close to the bottom plate portion into the portion of the upper shell which forms the circumferential wall portion close to the top plate portion, and the igniter is assembled to a portion of the lower shell which forms the bottom plate portion.

5. The gas generator according to claim 1, wherein the plurality of gas discharge openings consist of a plurality of groups of gas discharge openings, the plurality of groups of gas discharge openings include only one group or two or more groups of first gas discharge openings consisting of a plurality of first gas discharge openings set to be opened at an identical first opening pressure and evenly arranged along a circumferential direction of the cylindrical portion in rotation symmetry at an angle not greater than 120[°] around the axial line of the cylindrical portion, one group or two or more groups of second gas discharge openings consisting of a plurality of second gas discharge openings set to be opened at an identical second opening pressure and evenly arranged along the circumferential direction of the cylindrical portion in rotation symmetry at an angle not greater than 120[°] around the axial line of the cylindrical portion, and one group or two or more groups of third gas discharge openings consisting of a plurality of third gas discharge openings set to be opened at an identical third opening pressure and evenly arranged along the circumferential direction of the cylindrical portion in rotation symmetry at an angle not greater than 120[°] around the axial line of the cylindrical portion, the second opening pressure is higher than the first opening pressure, the third opening pressure is higher than the second opening pressure, and the plurality of gas discharge openings are arranged as not overlapping with each other in the circumferential direction of the cylindrical portion.

6. The gas generator according to claim 5, wherein at least any of the plurality of first gas discharge openings, the plurality of second gas discharge openings, and the plurality of third gas discharge openings is in such a shape that S and C satisfy a condition of $S/C \leq 0.27 \times S^{0.5}$ where S [mm$^2$] represents an opening area of one gas discharge opening and C [mm] represents a circumferential length of the one gas discharge opening.

7. The gas generator according to claim 5, wherein at least any of the plurality of first gas discharge openings, the plurality of second gas discharge openings, and the plurality of third gas discharge openings is in a shape of an elongated hole greater in opening width along an axial direction of the cylindrical portion than along a circumferential direction of the cylindrical portion.

* * * * *